US012381349B2

(12) United States Patent
Ashibu

(10) Patent No.: US 12,381,349 B2
(45) Date of Patent: Aug. 5, 2025

(54) CONNECTOR PREVENTING OCCURRENCE OFSOLDERWICKING UP FROM SURFACE MOUNT PORTION THEREOF

(71) Applicant: JAPAN AVIATION ELECTRONICS INDUSTRY, LIMITED, Tokyo (JP)

(72) Inventor: Kenta Ashibu, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 310 days.

(21) Appl. No.: 17/871,661

(22) Filed: Jul. 22, 2022

(65) Prior Publication Data

US 2023/0067502 A1 Mar. 2, 2023

(30) Foreign Application Priority Data

Sep. 1, 2021 (JP) ................................ 2021-142765

(51) Int. Cl.
*H01R 13/405* (2006.01)
*H01R 12/70* (2011.01)
(Continued)

(52) U.S. Cl.
CPC ......... *H01R 13/405* (2013.01); *H01R 12/707* (2013.01); *H01R 12/716* (2013.01); *H01R 13/115* (2013.01)

(58) Field of Classification Search
CPC .. H01R 13/405; H01R 12/707; H01R 12/716; H01R 13/115; H01R 12/57; H01R 12/73; H01R 12/714; H01R 13/516
See application file for complete search history.

(56) References Cited

U.S. PATENT DOCUMENTS 5,018,985 A * 5/1991 Moore ................. H01R 13/514 439/174
5,102,353 A * 4/1992 Brunker ............. H01R 13/6471 439/108
(Continued)

FOREIGN PATENT DOCUMENTS

CN 103682710 A 3/2014
JP S53116490 A 10/1978
(Continued)

OTHER PUBLICATIONS

Taiwanese Office Action (and an English language translation thereof) dated Mar. 6, 2023, issued in counterpart Taiwanese Application No. 111127742.
(Continued)

*Primary Examiner* — Travis S Chambers
(74) *Attorney, Agent, or Firm* — Holtz, Holtz & Volek PC

(57) ABSTRACT

A connector includes terminals, a holding portion made of insulating resin, and a housing. Each of the terminals has a surface mounting technology (SMT) portion, a spring portion, a contact point, and a connection portion. The SMT portion is soldered to an object. The holding portion is directly held by the housing. The housing has accommodation portions which accommodate the spring portions of the terminals, respectively, and a barrier wall which separates two of the accommodation portions which are adjacent to each other. The connector is configured to prevent occurrence of solder wicking up from the SMT portion when the SMT portion is soldered to the object.

7 Claims, 25 Drawing Sheets

(51) Int. Cl.

| | |
|---|---|
| ***H01R 12/71*** | (2011.01) |
| ***H01R 13/115*** | (2006.01) |

(56) References Cited

U.S. PATENT DOCUMENTS

| | | | | |
|---|---|---|---|---|
| 5,558,542 | A * | 9/1996 | O'Sullivan ............ | H01R 13/40 439/682 |
| 6,953,351 | B2 * | 10/2005 | Fromm ................ | H01R 13/514 439/101 |
| 8,888,506 | B2 | 11/2014 | Nishimura et al. | |
| 10,777,932 | B2 | 9/2020 | Mechteridis et al. | |
| 2013/0330969 | A1 | 12/2013 | Avery et al. | |
| 2014/0099804 | A1 * | 4/2014 | Kobuchi ................ | H01R 12/73 439/55 |
| 2014/0162472 | A1 | 6/2014 | Walden et al. | |
| 2020/0176909 | A1 * | 6/2020 | Kobayashi ............. | H01R 43/24 |

FOREIGN PATENT DOCUMENTS

| | | | |
|---|---|---|---|
| JP | H1131572 | A | 2/1999 |
| JP | 2011171101 | A | 9/2011 |
| JP | 2011216404 | A | 10/2011 |
| JP | 2014146588 | A | 8/2014 |
| JP | 2018206531 | A | 12/2018 |
| JP | 2019165000 | A | 9/2019 |
| JP | 2020061340 | A | 4/2020 |
| JP | 2020188022 | A | 11/2020 |
| JP | 2020202012 | A | 12/2020 |
| JP | 2021086828 | A | 6/2021 |
| TW | M409607 | U | 8/2011 |
| TW | 201244276 | A | 11/2012 |
| TW | 201436375 | A | 9/2014 |

OTHER PUBLICATIONS

Taiwanese Office Action dated Aug. 14, 2023 (and English translation thereof), issued in counterpart Taiwanese Application No. 11112774.

Korean Office Action dated Mar. 23, 2024 (and English translation thereof), issued in counterpart Korean Application No. 10-2022-0095382.

Japanese Office Action (and an English language translation thereof) dated May 7, 2025, issued in counterpart Japanese Application No. 2021-142765.

* cited by examiner

CONNECTOR PREVENTING OCCURRENCE OFSOLDERWICKING UP FROM SURFACE MOUNT PORTION THEREOF

CROSS REFERENCE TO RELATED APPLICATIONS

This application is based on and claims priority under 35 U.S.C. § 119 to Japanese Patent Application No. JP2021-142765 filed Sep. 1, 2021, the contents of which are incorporated herein in their entirety by reference.

BACKGROUND OF THE INVENTION

This invention relates to a connector, particularly, to a surface-mount type connector.

JPA 2021-086828 (Patent Document 1) discloses an example of a surface-mount type connector.

As shown in FIG. 49, a connector 90 of Patent Document 1 has a plurality of terminals 92 and a housing 94 which holds the terminals 92. In detail, each of the terminals 92 is formed of a metal member, and the housing 94 is made of insulating material. The terminals 92 and the housing 94 are integrally formed by insert molding.

As understood from FIG. 50, a surface mounting technology (SMT) portion 921 of each of the terminals 92 is exposed outside from the housing 94. On the other hand, a held portion 923 of each of the terminals 92 is embedded in the insulating material of the housing 94 at least in part. With this structure, when the connector 90 is mounted on an object (not shown) and the SMT portion 921 is soldered to the object, solder wicking up the held portion 923 or moving of solder along the held portion 923 can be prevented.

SUMMARY OF THE INVENTION

As understood from FIG. 50, a space 96 exists around a spring portion 925 of each of the terminals 92. In order to form the space 96, a mold (not shown) used in insert molding for the housing 94 has a wall portion (not shown) to define the space 96.

Here, between the spring portions 925 adjacent to each other, a barrier wall 941 exists. In order to secure strength of the housing 94 made of the, a size of the barrier wall 941 should be as large as possible in a pitch direction. This means that a size of a gap between the spring portion 925 and the barrier wall 941 should be as small as possible in the pitch direction. In other words, an occupation ratio or a housing material density of the housing 94 between two of the terminals 92 adjacent to each other should be as high as possible. So, it is necessary that a size or a thickness of a wall portion (not shown) which is a part of the mold (not shown) used in the insert molding for the housing 94 and which is to be located between the spring portion 925 and the barrier wall 941 is as small as possible in the pitch direction. However, if the size of the wall portion of the mold is reduced in the pitch direction, the wall portion might not withstand pressure from the insulating material when the insert molding. Accordingly, the connector 90 of Patent Document 1 has a problem that the housing material density between the terminals 29 adjacent to each other is hard to be increased.

It is an object of the present invention to provide a connector which can obtain strength necessary for a housing thereof by increasing a housing material density between terminals thereof without losing an advantage of insert molding which can prevent solder wicking up.

One aspect of the present invention provides a connector which comprises a plurality of terminals, a holding portion made of insulating resin and a housing. Each of the terminals has a surface mounting technology (SMT) portion, a spring portion, a contact point and a connection portion. The SMT portion is to be soldered when the connector is mounted on an object. The spring portion has resilience. The contact point is supported by the spring portion. The spring portion and the SMT portion are apart from each other in a predetermined direction. The connection portion connects the spring portion and the SMT portion to each other. The connection portion has a held portion extending at least in the predetermined direction The held portion is embedded in the holding portion at least in part so that the holding portion holds the held portion. The holding portion is held by the housing. The housing has a plurality of accommodation portions which accommodate the spring portions of the terminals, respectively, and a barrier wall which separates two of the accommodation portions which are adjacent to each other.

In the connector according to the aspect of the present invention, the held portion of the terminal is held by the holding portion made of the insulating resin, and the holding portion made of the insulating resin is held by the housing. With this structure, the connector can prevent solder wicking up similarly to a connector formed by insert molding when mounted on the object. In addition, with this structure, formation of the housing can be performed regardless of the terminals, so that a housing material density between the terminals adjacent to each other can be increased. Thus, the housing can be increased in strength. Furthermore, the structure is advantageous for narrowing pitch of terminals.

An appreciation of the objectives of the present invention and a more complete understanding of its structure may be had by studying the following description of the preferred embodiment and by referring to the accompanying drawings.

Figure 1:
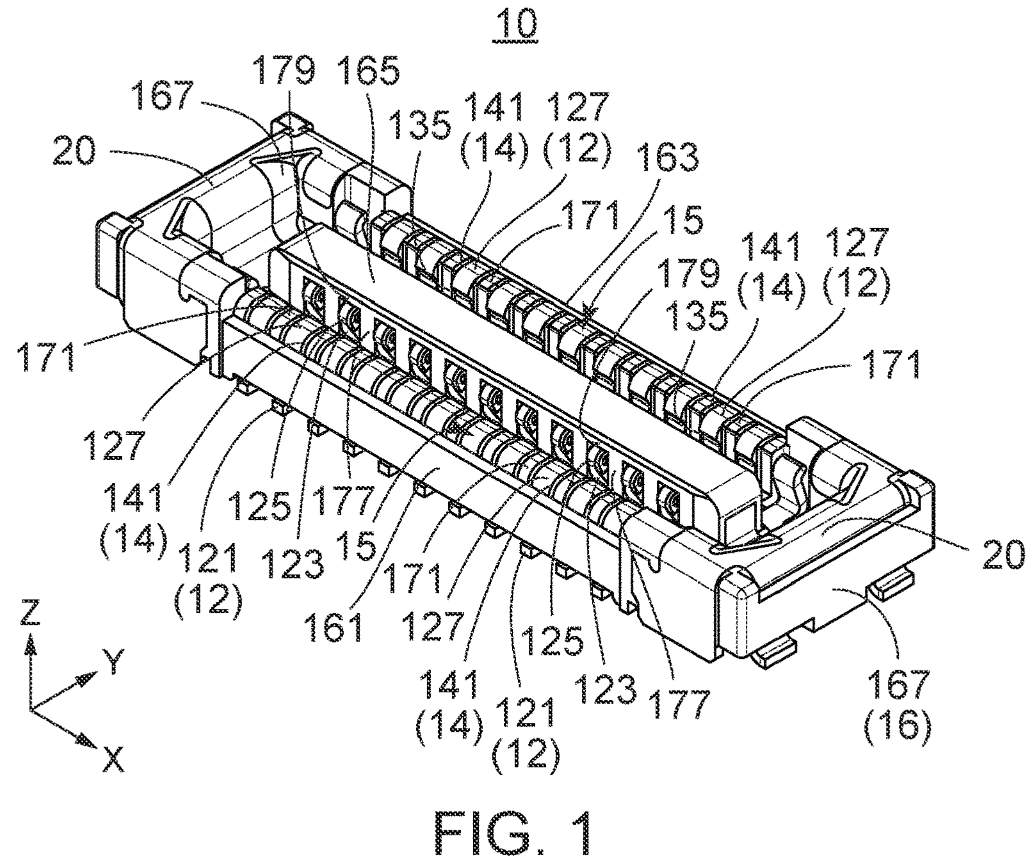
FIG. 1 is a perspective view showing a connector according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

As understood from FIG. 1, a connector 10 according to a first embodiment of the present invention is a surface-mount type connector to be mounted on an object (not shown). The connector 10 is mateable with and separable from a mating connector (not shown) in an up-down direction. In other words, the connector 10 defines a mating direction directed upward in the up-down direction. In the present embodiment, the up-down direction is a Z-direction. A positive Z-direction is directed upward while a negative Z-direction is directed downward.

Referring to FIGS. 1 to 4, the connector 10 is provided with a plurality of signal terminals (terminals) 12, holding portions 14, a housing 16 and a pair of power source terminals 20. The holding portions 14 hold the signal terminals 12. Moreover, the holding portions 14 are held by the housing 16.

As shown in FIGS. 1 to 4, the signal terminals 12 are twenty-two in number in the present embodiment. Moreover, the signal terminals 12 are arranged in two rows in the present embodiment. However, the present invention is not limited thereto. In the present invention, the signal terminals 12 should be at least two in number. Moreover, in the present invention, the signal terminals 12 should be arranged in at least one row.

As shown in FIGS. 7 to 11, each of the signal terminals 12 has a surface mounting technology (SMT) portion 121, a spring portion 123, a contact point 125 and a connection portion 127. The signal terminal 12 is formed of a single metal member. The SMT portion 121, the spring portion 123, the contact point 125 and the connection portion 127 are integrally formed.

As shown in FIGS. 7 to 11, the SMT portion 121 forms one of end portions of the signal terminals 12. The SMT portion 121 is located at the lowest portion of the signal terminal 12 and at a front-end portion of the signal terminal 12. The SMT portion 121 is a part to be soldered to the object when the connector 10 is mounted on the object. In the present embodiment, a front-rear direction is a Y-direction. A positive Y-direction is directed rearward while a negative Y-direction is directed frontward.

As understood from FIGS. 7 to 10, the spring portion 123 forms a remaining one of the end portions of the signal terminal 12. The spring portion 123 and the SMT portion 121 are apart from each other in a predetermined direction. In the present embodiment, the predetermined direction is the front-rear direction. In detail, the spring portion 123 is located rearward of the SMT portion 121 in the front-rear direction.

Figure 10:
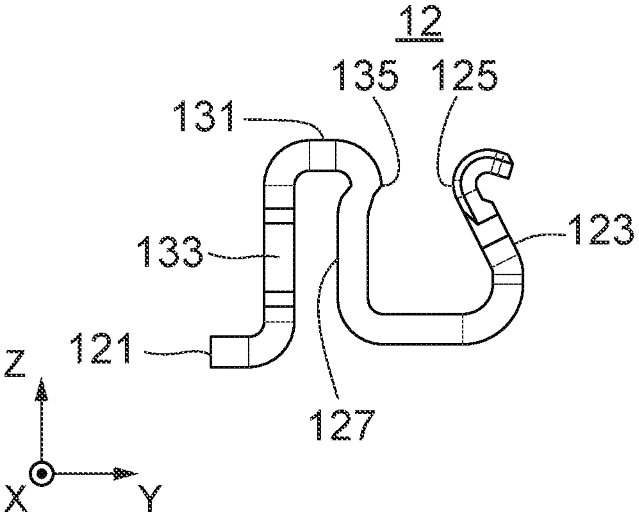
FIG. 10 is a side view showing the signal terminal of FIG. 7.
Figure 11:
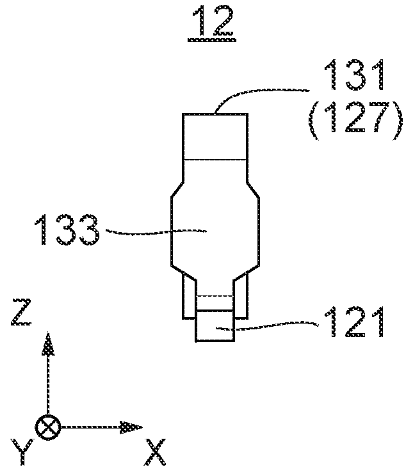
FIG. 11 is a front view showing the signal terminal of FIG. 7.
Figure 12:
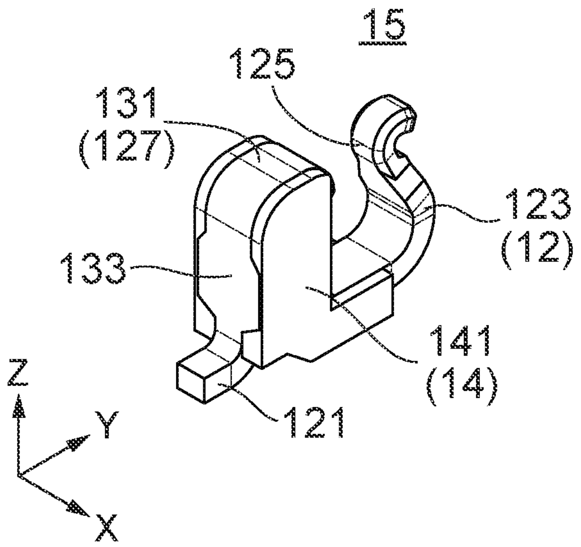
FIG. 12 is a perspective view showing one of terminal molded bodies concerning the front row included in the connector of FIG. 1.
Figure 13:
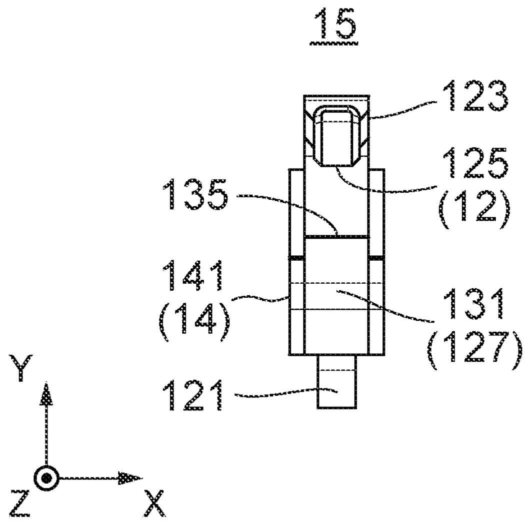
FIG. 13 is a plan view showing the terminal molded body of FIG. 12.

As shown in FIG. 10, the spring portion 123 has an approximately S-shape when viewed along a lateral direction. In addition, as understood from FIGS. 7 and 8, the spring portion 123 has a maximum size at a lower end thereof in the lateral direction. In the present embodiment, the lateral direction is an X-direction.

Figure 7:
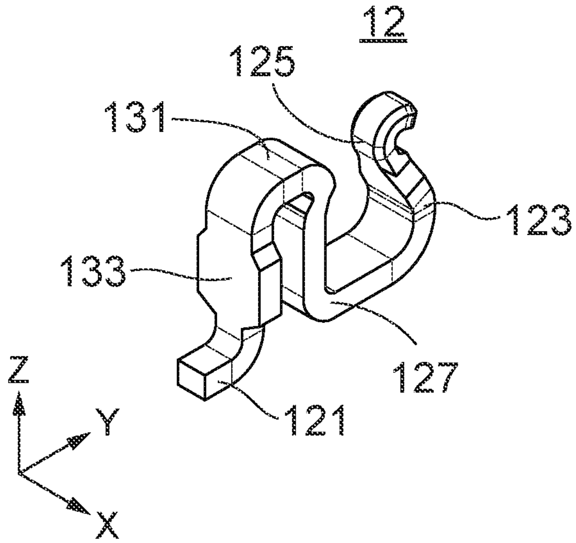
FIG. 7 is a perspective view showing one of signal terminals of a front row included in the connector of FIG. 1.
Figure 8:
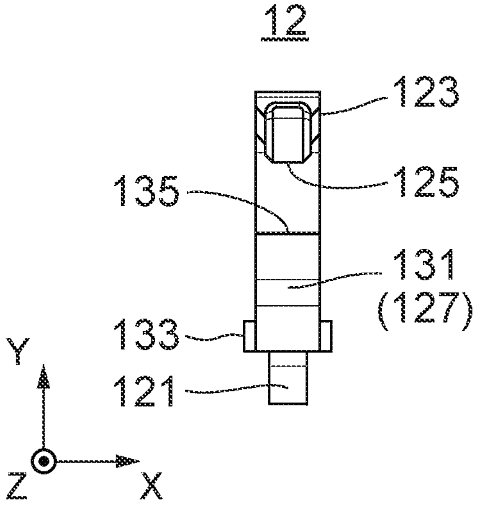
FIG. 8 is a plan view showing the signal terminal of FIG. 7.
Figure 9:
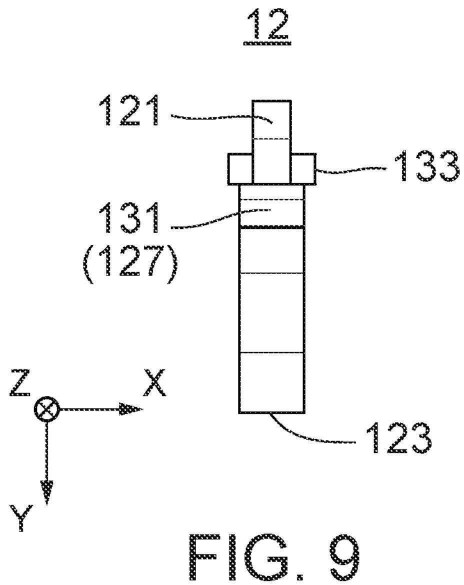
FIG. 9 is a bottom view showing the signal terminal of FIG. 7.

As understood from FIGS. 7, 8 and 10, the contact point 125 is supported by the spring portion 123. In detail, the contact point 125 is a part of a surface of the spring portion 123. The contact point 125 is directed forward in the front-rear direction. Moreover, the spring portion 123 has resilience. The contact point 125 is movable at least in the front-rear direction owing to resilient deformation of the spring portion 123.

As shown in FIGS. 7 and 10, the connection portion 127 connects the SMT portion 121 and the spring portion 123 to each other. The connection portion 127 has a held portion 131 extending at least in the predetermined direction. In detail, the held portion 131 of the connection portion 127 extends upward from a rear end of the SMT portion 121, then forward and further downward. The held portion 131 is provided with a wide portion 133 which is wider than other parts of the held portion 131 in the lateral direction. In addition, the held portion 131 is provided with an auxiliary contact point 135 which is apart from and faces the contact point 125. The connection portion 127 further extends rearward from the held portion 131 to be connected to the lower end of the spring portion 123.

As understood from FIGS. 12 to 16, each of the holding portions 14 has holding pieces 141 each of which corresponds to one of the signal terminals 12. In other words, in the present embodiment, each of the holding portions 14 is formed of a plurality of holding pieces 141 which correspond to signal terminals 12, respectively, and which are distinct and separated from one another. Each of the holding pieces 141 is made of insulating resin. The insulating resin may be made of materials which are same as or different from those of after-mentioned insulating resin used for the housing 16. For example, the insulating resin used for the holding piece 141 may have a hardness lower than that of the insulating resin used for the housing 16. The holding piece 141 is integrally formed with the signal terminal 12 corresponding thereto. Then, the holding piece 141 forms a terminal molded body 15 together with the signal terminal 12 corresponding thereto. This structure allows individual insert molding for the signal terminals 12 so that the insert molding is easy. In addition, the terminal molded body 15 can be used for another connector different from the connector 10 in point of the number of the signal terminals 12 and the arrangement of the signal terminals 12.

Figure 14:
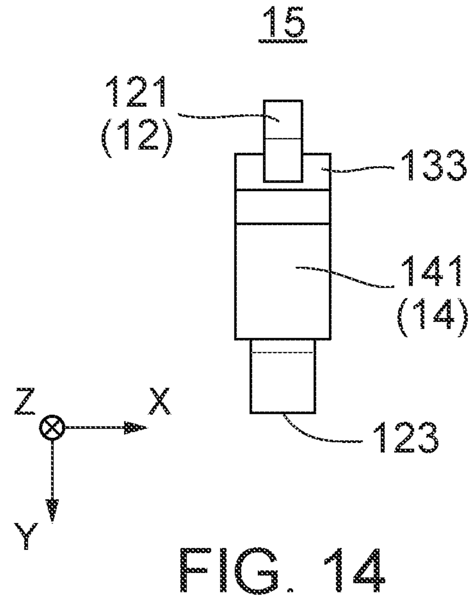
FIG. 14 is a bottom view showing the terminal molded body of FIG. 12.
Figure 15:
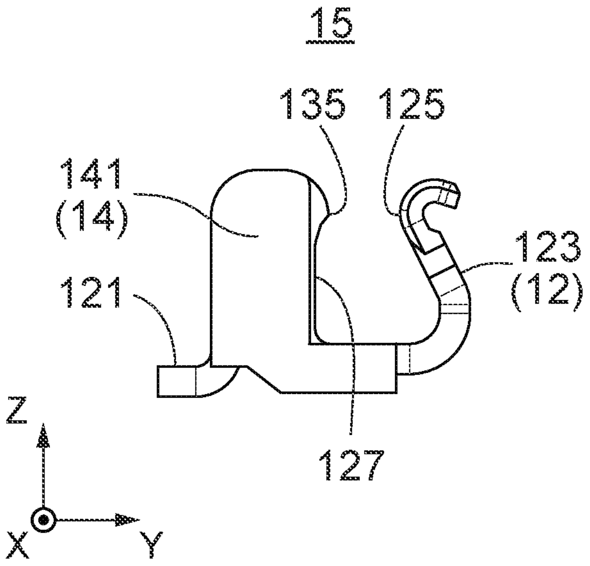
FIG. 15 is a side view showing the terminal molded body of FIG. 12.
Figure 16:
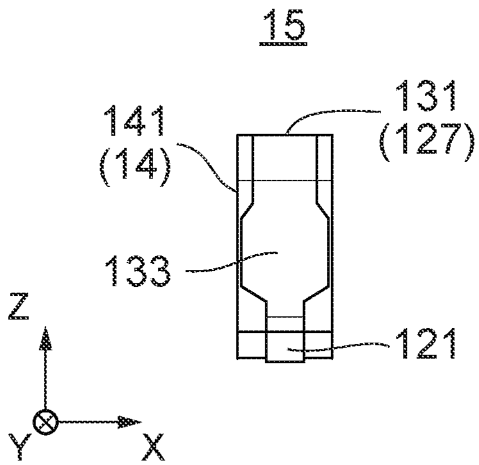
FIG. 16 is a front view showing the terminal molded body of FIG. 12.

As understood from FIGS. 12 to 16, the holding piece 141 covers the held portion 131 of the signal terminal 12 at least in part. In other words, the held portion 131 of the signal terminal 12 is embedded in the holding piece 141 or the holding portion 14 at least in part. In the present embodiment, the holding piece 141 covers almost the whole of the connection portion 127 when viewed along the lateral direction. The SMT portion 121 and the spring portion 123 are not covered with the holding piece 141 but are exposed outside from the holding piece 141. As shown in FIG. 14, the holding piece 141 or the holding portion 14 hides the held portion 131 when viewed from beneath in the up-down direction. With this structure, solder wicking up from the SMT portion 121 to the connection portion 127 can be prevented when the connector 10 is mounted on the object (not shown).

As shown in FIGS. 17 to 20, the housing 16 has an approximately parallelepiped outer shape with a low profile. In the present embodiment, the shape of the housing 16 is symmetric with respect to an axis extending in the front-rear direction and symmetric with respect to an axis extending in the lateral direction. However, the present invention is not limited thereto. The shape of the housing 16 may be freely designed.

Figure 17:
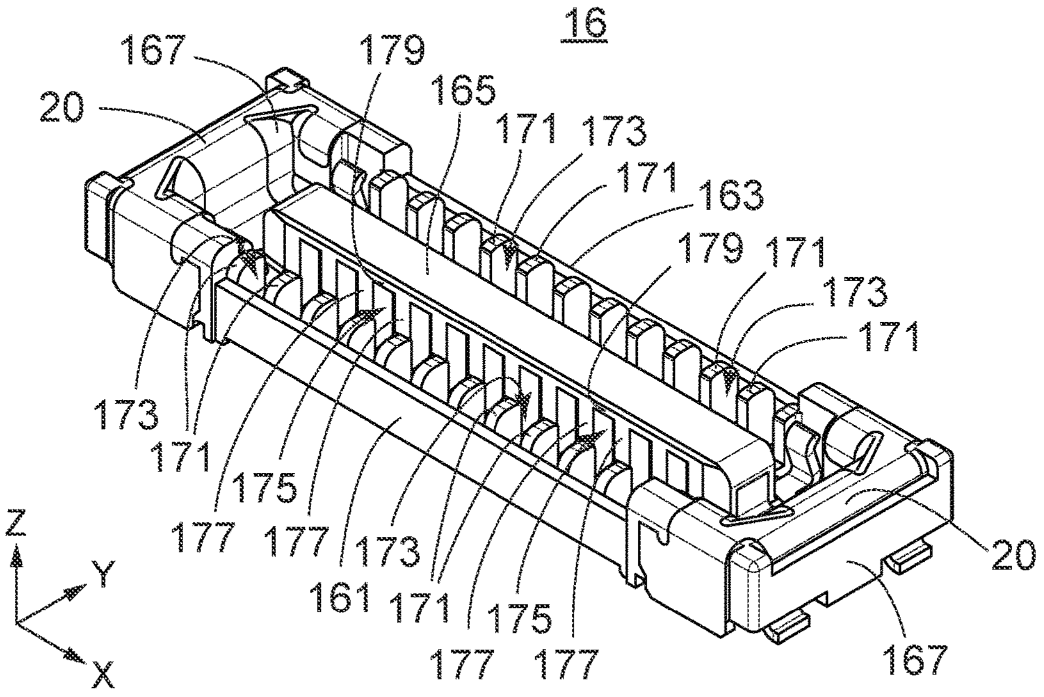
FIG. 17 is a perspective view showing a housing included in the connector of FIG. 1. The housing is integrally formed with power source terminals.
Figure 18:
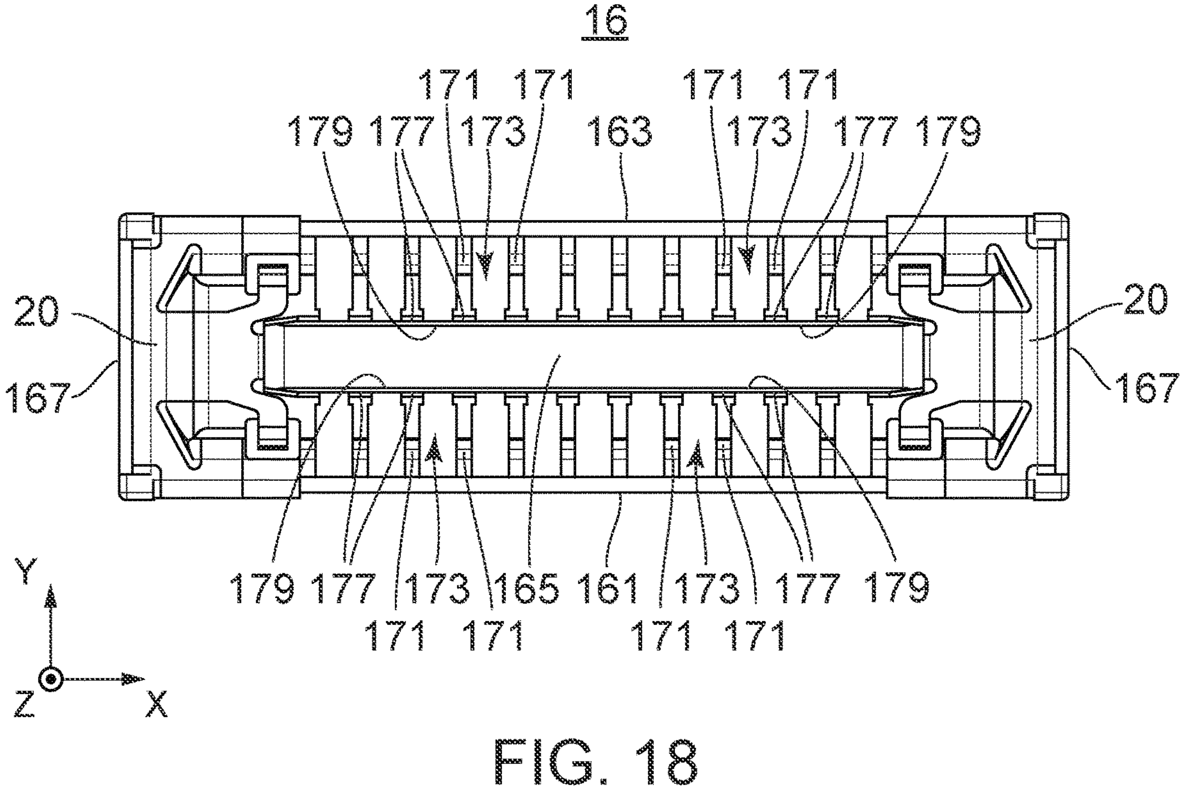
FIG. 18 is a plan view showing the housing of FIG. 17.
Figure 19:
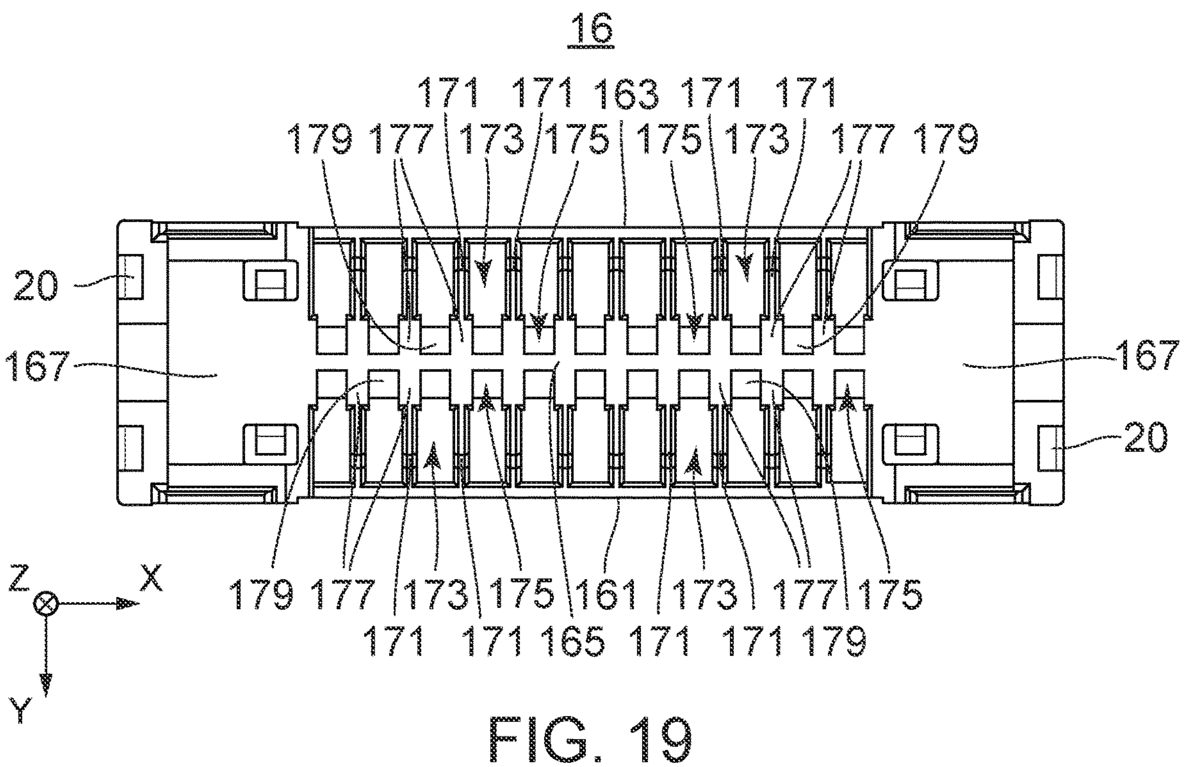
FIG. 19 is a bottom view showing the housing of FIG. 17.
Figure 20:
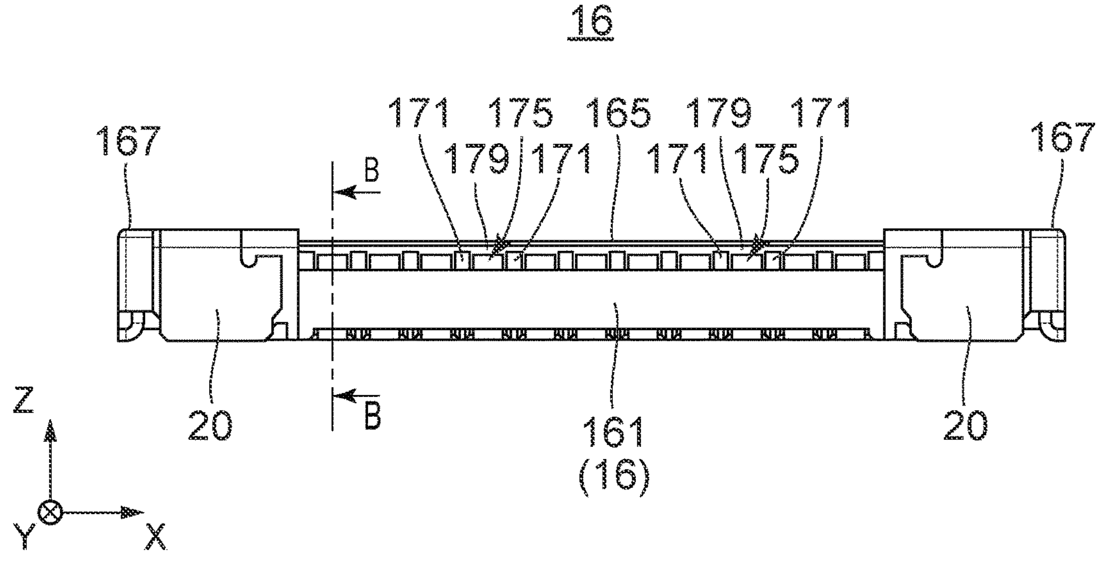
FIG. 20 is a front view showing the housing of FIG. 17.

As understood from FIGS. 17 to 19, the housing 16 has a front wall 161, a rear wall 163, a middle wall 165 and a pair of end portions 167. The housing 16 is made of insulating resin. The housing 16 is integrally formed with the power source terminals 20 by insert molding. The power source terminals 20 are located on the end portions 167 of the housing 16, respectively. However, the present invention is not limited thereto. The power source terminals 20 may not be integrally formed with the housing 16. The power source terminals 20 do not relate to the present invention directly, so that the description thereof will be omitted.

As understood from FIGS. 17 to 21, partition walls 171 each of which extends in the front-rear direction are provided between the front wall 161 and the middle wall 165. Similarly, also between the rear wall 163 and the middle wall 165, the partition walls 171 each of which extends in the front-rear direction are provided. Two of the partition walls 171 which are adjacent to each other in the lateral direction form a receiving portion 173 therebetween to receive the signal terminal 12 in part. In the lateral direction, the receiving portion 173 is equal to or slightly smaller than the holding piece 141 in size.

Figure 21:
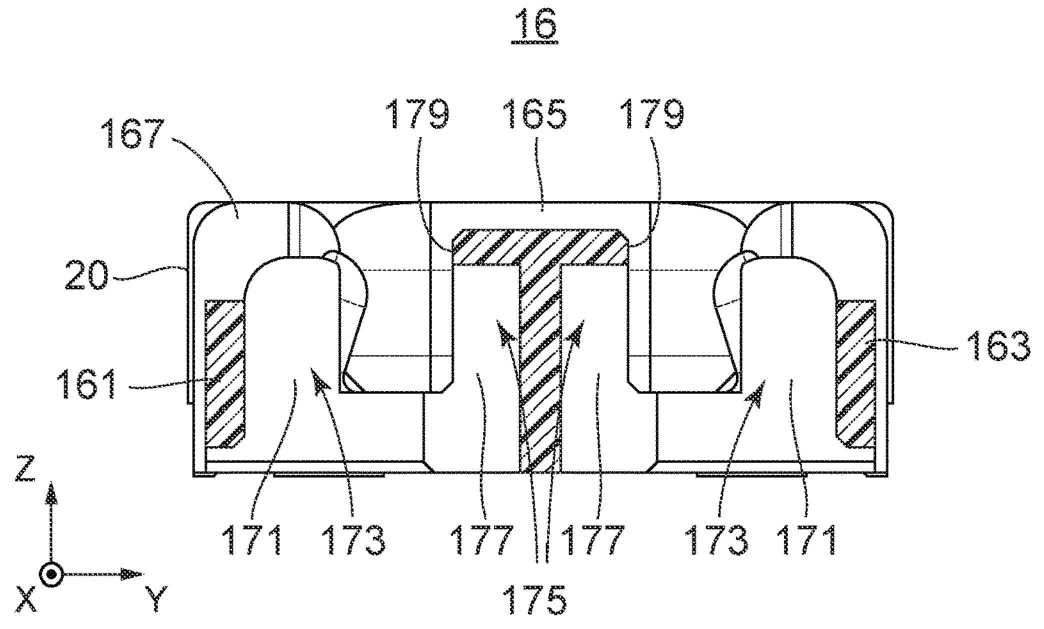
FIG. 21 is a cross-sectional view showing the housing of FIG. 20, taken along line B-B.
Figure 22:
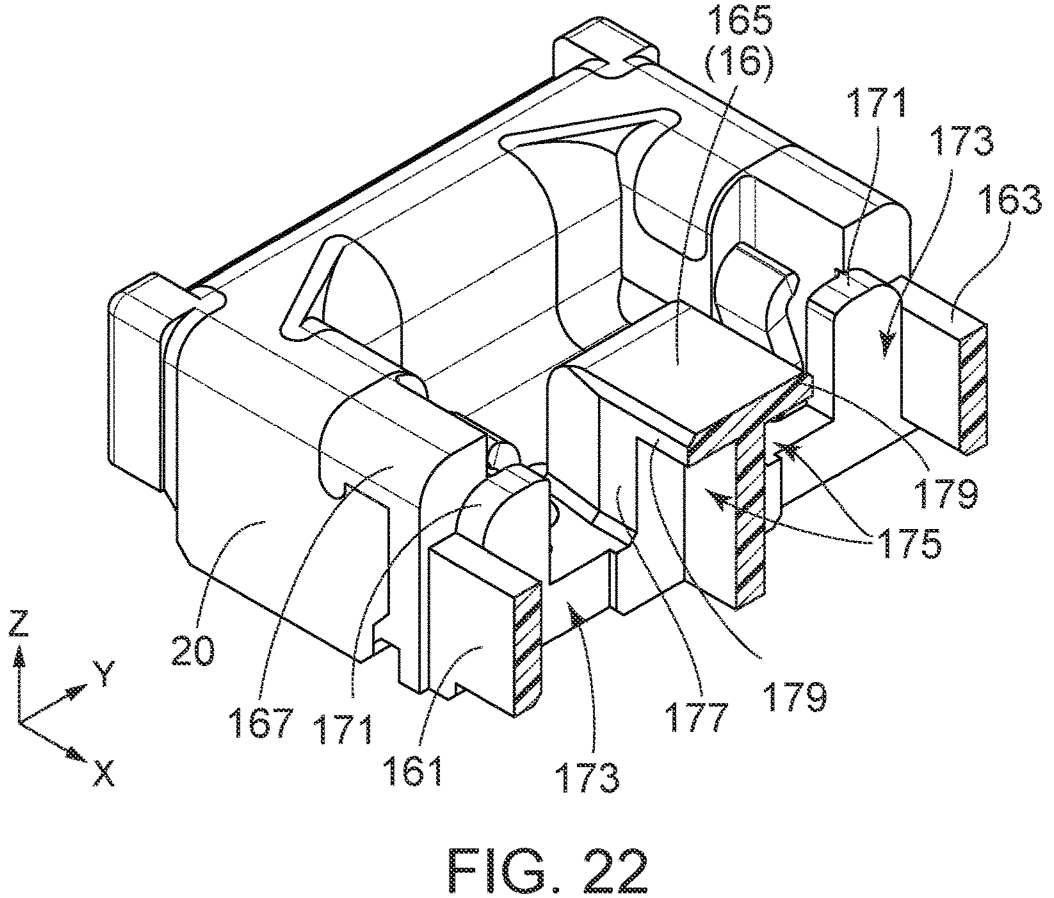
FIG. 22 is a cross-sectional, perspective view showing a part of the housing of FIG. 20.

As shown in FIGS. 17, 21 and 22, the middle wall 165 is formed with accommodation portions 175 which communicate with the receiving portions 173, respectively. In other words, the housing 16 has the accommodation portions 175 corresponding to the signal terminals 12, respectively. Each of the accommodation portions 175 accommodates, at least in part, the spring portion 123 of the signal terminal 12 corresponding thereto. Between the accommodation portions 175 adjacent to each other, a barrier wall 177 is provided. In other words, the housing 16 has the barrier walls 177. In the lateral direction, a size of the accommodation portion 175 is larger than the maximum size of the spring portion 123 of the signal terminal 12.

Figure 2:
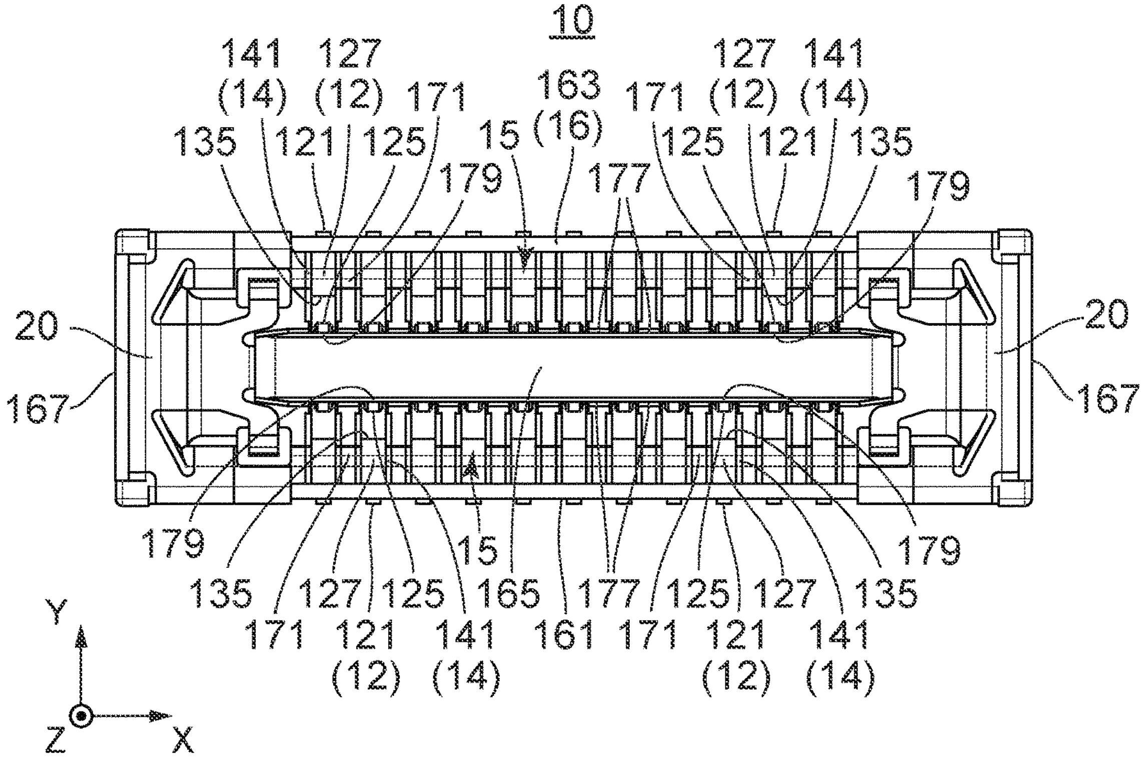
FIG. 2 is a plan view showing the connector of FIG. 1.
Figure 3:
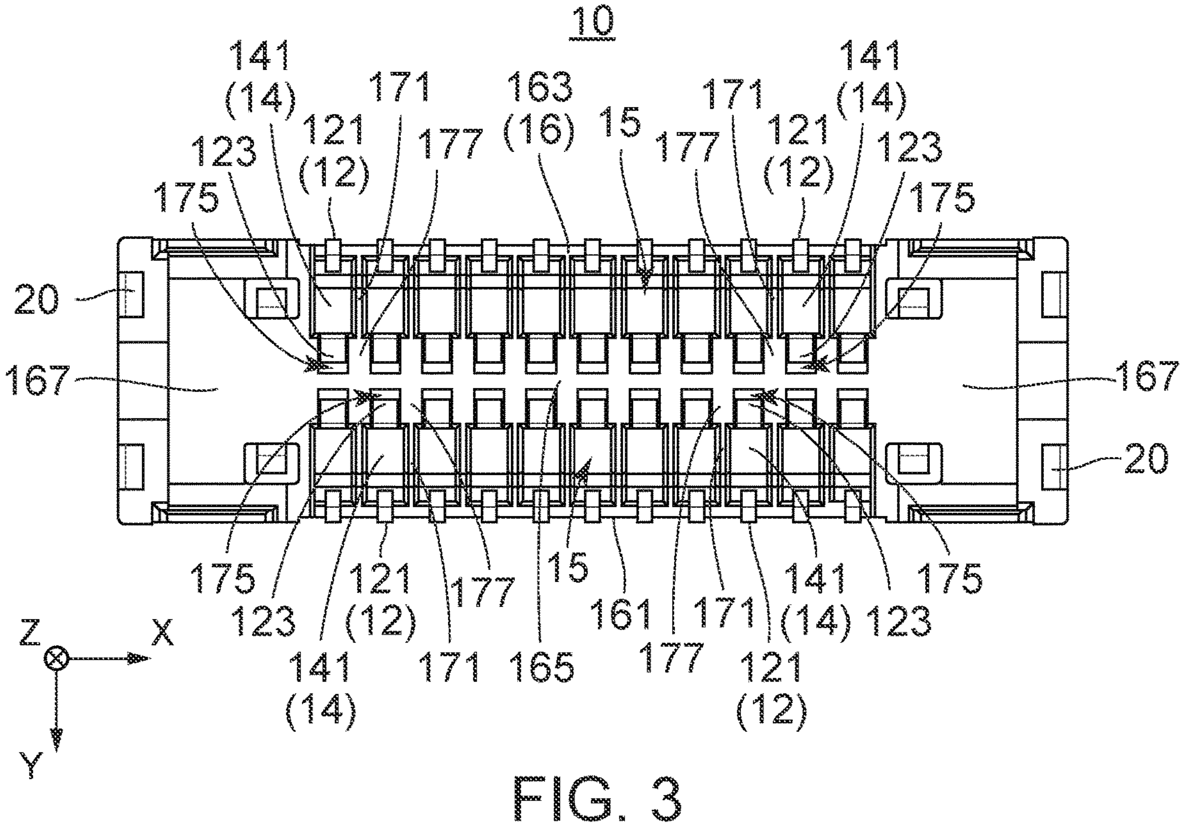
FIG. 3 is a bottom view showing the connector of FIG. 1.
Figure 4:
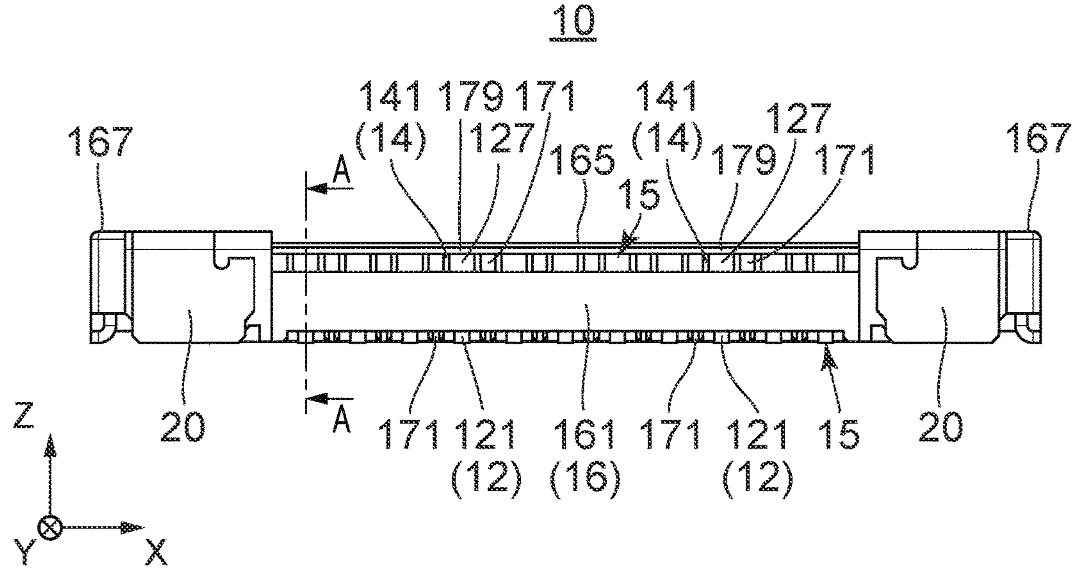
FIG. 4 is a front view showing the connector of FIG. 1.

Referring to FIGS. 1 to 3, the holding pieces 141 of the terminal molded bodies 15 are held by the housing 16. As understood from FIGS. 5 and 6, in the present embodiment, each of the terminal molded bodies 15 is press-fit into the housing 16 from beneath in the up-down direction. In detail, the holding piece 141 of the terminal molded body 15 or the holding portion 14 is press-fit into the housing 16 from beneath in the up-down direction. The terminal molded body 15 is held between the partition walls 171 adjacent to each other. When the hardness of the insulating resin used for the holding piece 141 is lower than that of the insulating resin used for the housing 16, press-fitting of the holding piece 141 into the housing 16 can be easily carried out, and the housing 16 is prevented from being damaged.

As understood from FIGS. 1 to 3, in a state that the terminal molded bodies 15 are held by the housing 16, each of the signal terminals 12 is received by the receiving portion 173 corresponding thereto, and the spring portion 123 thereof is accommodated in the accommodation portion 175 corresponding thereto at least in part. The spring portion 123 and the barrier wall 177 are apart from each other in the lateral direction to leave a gap therebetween, so that the spring portion 123 can be resiliently movable without interfering with the barrier wall 177. In the present embodiment, the housing 16 is not formed with the signal terminals 12 integrally. Accordingly, the gap between the spring portion 123 and the barrier wall 177 can be easily reduced in the lateral direction. In other words, the size of the barrier wall 177 can be increased in the lateral direction, so that the housing 16 can be increased in strength. Moreover, an occupying ratio of the housing 16 or the housing material density between two of the signal terminals 12 adjacent to each other can be increased, so that a necessary strength of the housing 16 can be secured and a terminal pitch can be reduced.

Figure 5:
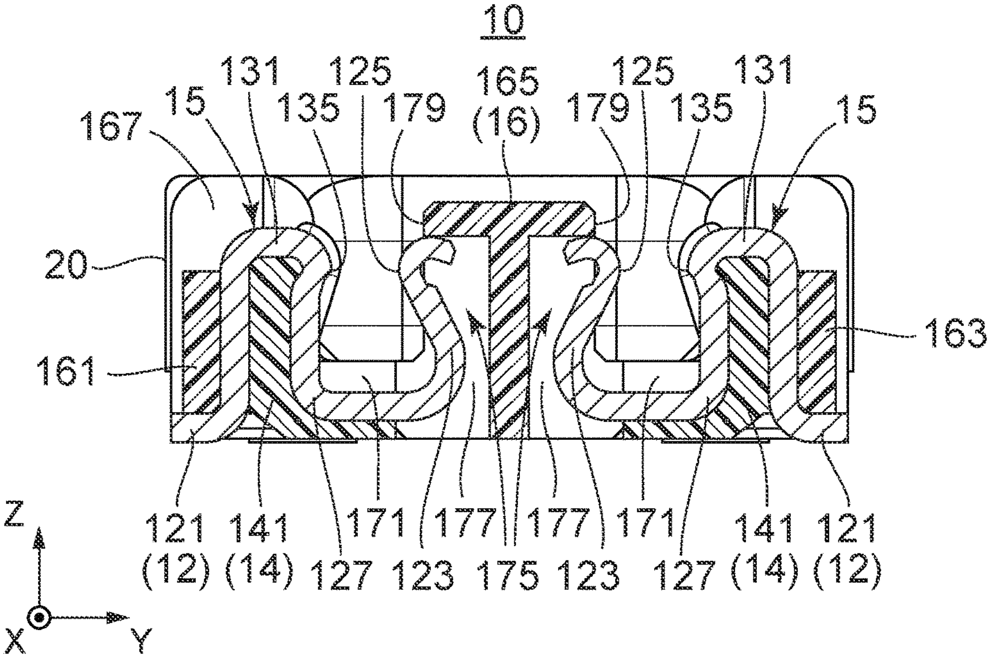
FIG. 5 is a cross-sectional view showing the connector of FIG. 4, taken along line A-A.
Figure 6:
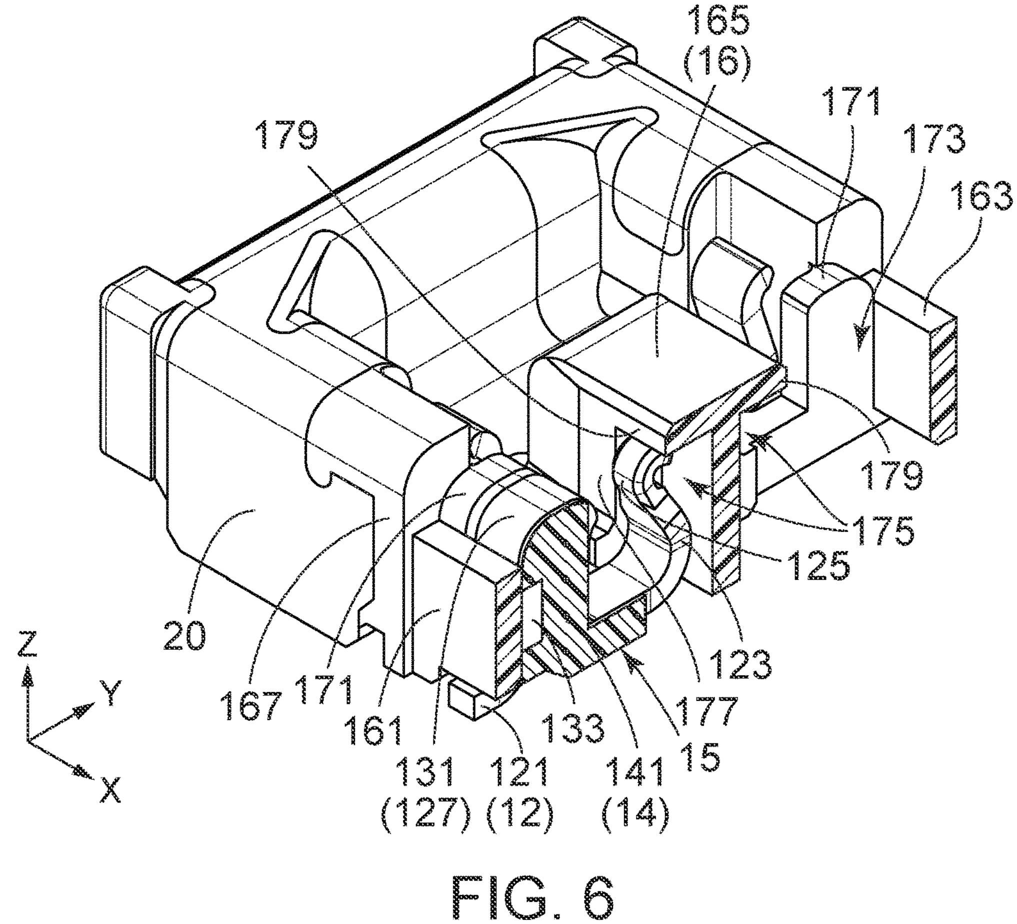
FIG. 6 is a cross-sectional, perspective view showing a part of the connector of FIG. 1. A terminal molded body concerning a rear row is omitted.

As understood from FIGS. 5 and 6, the housing 16 has the protection portions 179 located upward of the accommodation portions 175, respectively. As understood from FIGS. 1 and 2, each of the protection portions 179 partially hides the spring portion 123 corresponding thereto when the housing 16 is viewed from above in the up-down direction. Particularly, the protection portion 179 hides a tip of the spring portion 123 corresponding thereto. Accordingly, when the connector 10 and the mating connector (not shown) are mated with each other, the spring portion 123 can be prevented from bucking.

Second Embodiment

Referring to FIGS. 23 to 26, a connector 10A according to a second embodiment of the present invention is provided with a plurality of terminals 12A, a holding portion 14A and a housing 16A. The holding portion 14A holds the terminals 12A. The holding portion 14A is held by the housing 16A. The connector 10A is a surface-mount type connector to be mounted on a surface of an object (not shown) and defines a mating direction directed upward in the up-down direction.

Figure 24:
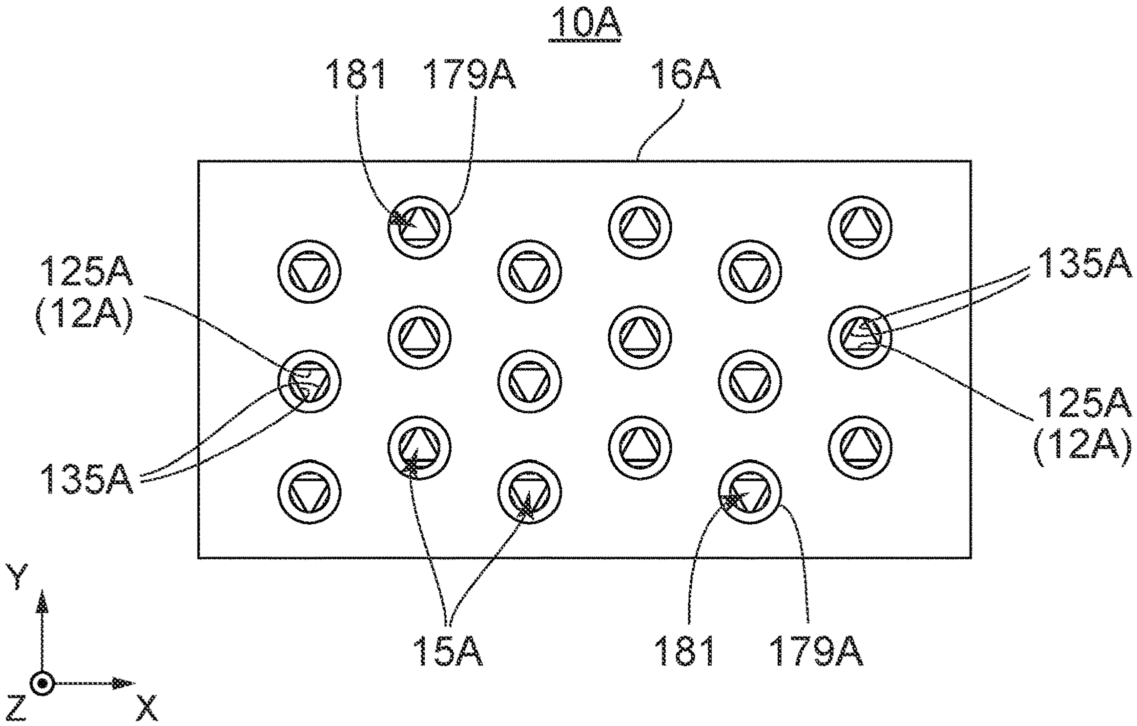
FIG. 24 is a plan view showing the connector of FIG. 23.
Figure 25:
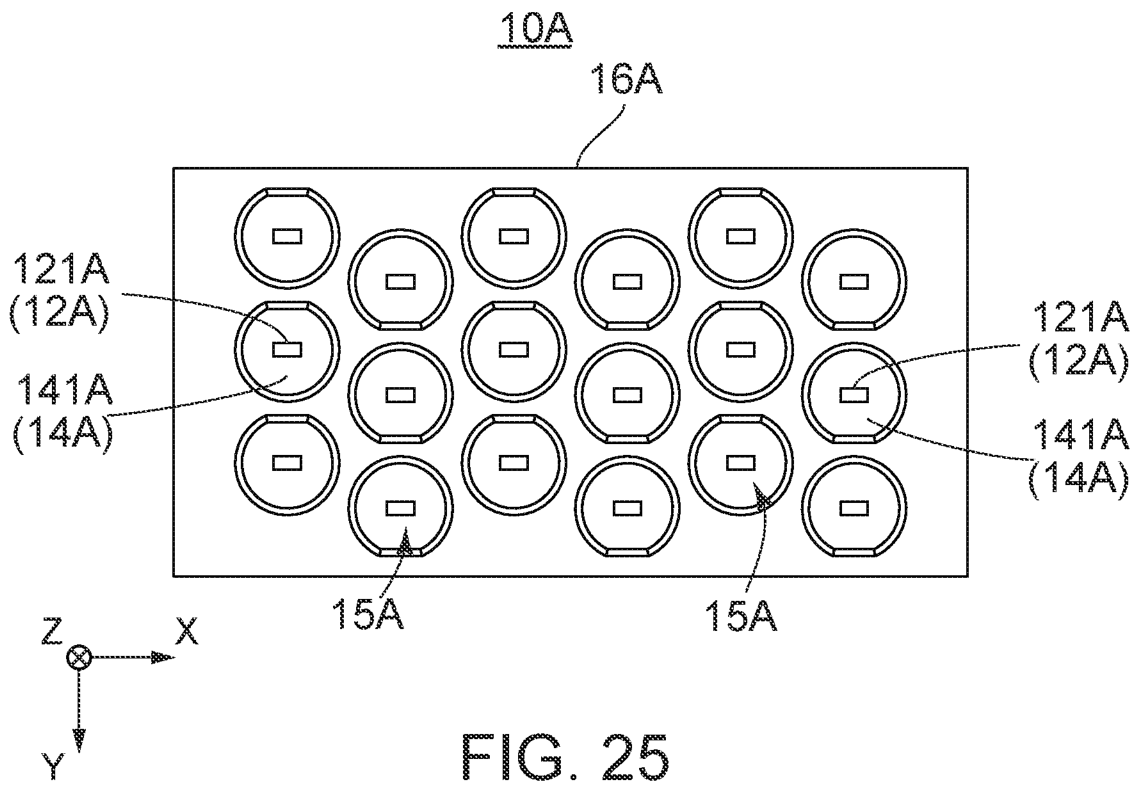
FIG. 25 is a bottom view showing the connector of FIG. 23.
Figure 26:
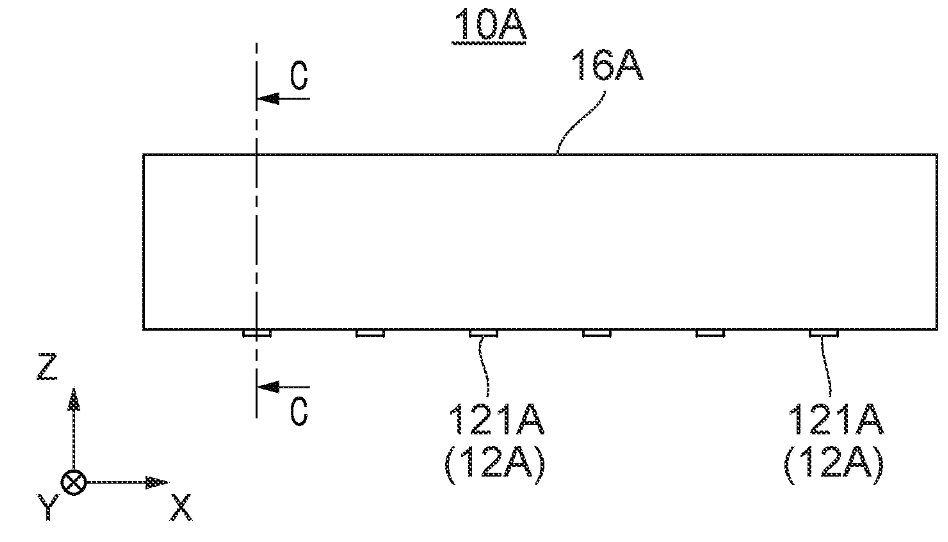
FIG. 26 is a front view showing the connector of FIG. 23.

As shown in FIGS. 24 and 25, in the present embodiment, the terminals 12A are eighteen in number. Moreover, in the present embodiment, the terminals 12A are arranged in a staggered arrangement. However, the present invention is not limited thereto. In the present invention, the terminals 12A should be at least two in number. Moreover, in the present invention, the arrangement of the terminals 12A should be arranged in at least one row.

Figure 27:
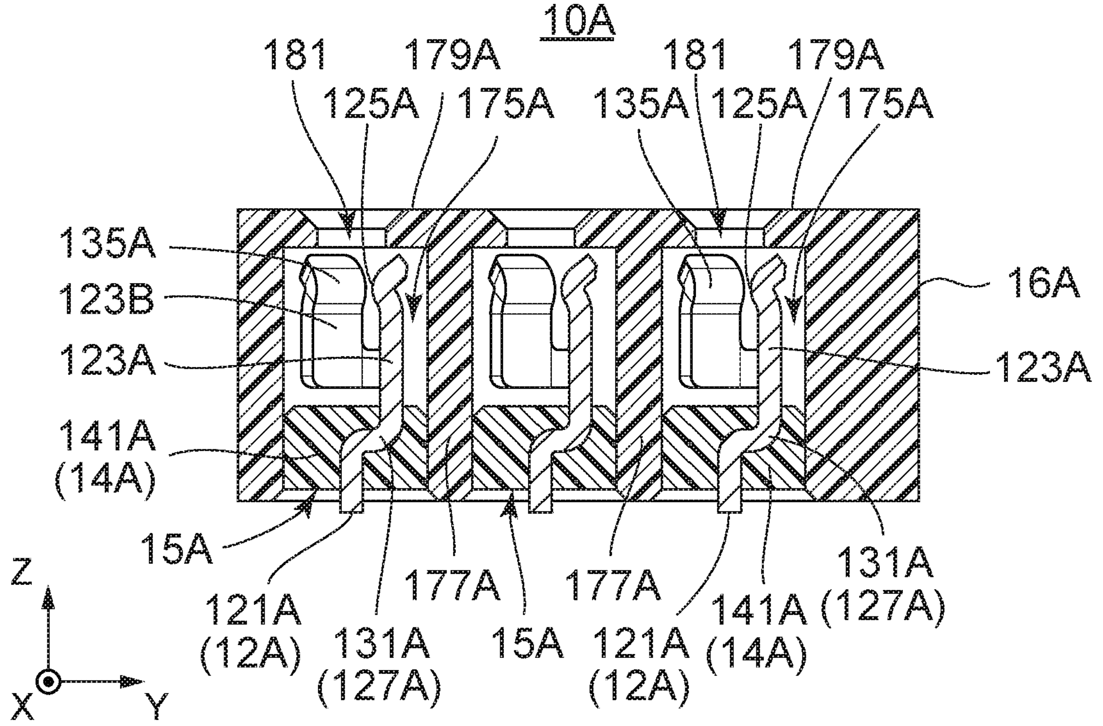
FIG. 27 is a cross-sectional view showing the connector of FIG. 26, taken along line C-C.
Figure 28:
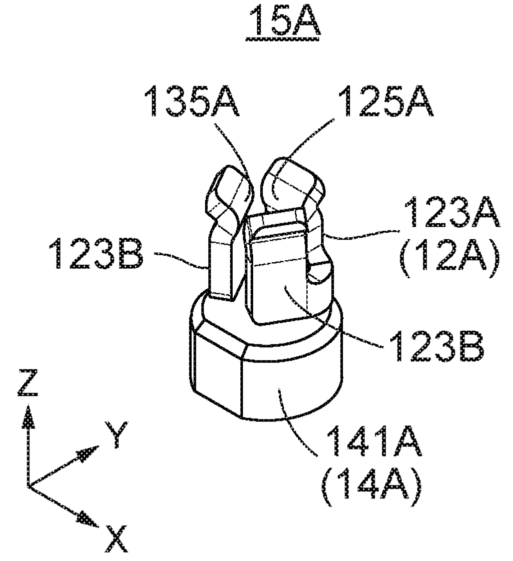
FIG. 28 is a perspective view showing one of terminal molded bodies included in the connector of FIG. 23.

As understood from FIGS. 27 and 28, each of the terminals 12A has a surface mounting technology (SMT) portion 121A, a spring portion 123A, a contact point 125A, a connection portion 127A, two auxiliary spring portions 123B and two auxiliary contact points 135A. The terminal 12A is formed of a single metal member. The SMT portion 121A, the spring portion 123A, the contact point 125A, the connection portion 127A, the auxiliary spring portions 123B and the auxiliary contact points 135A are integrally formed.

As shown in FIG. 27, the SMT portion 121A forms a lower end portion of the terminal 12A. The SMT portion 121A extends downward in the up-down direction. On the other hand, the spring portion 123A forms an upper portion of the terminal 12A. The spring portion 123A extends upward from a lower end thereof in the up-down direction, then extends forward diagonally, and further extends rearward diagonally.

As shown in FIG. 27, the connection portion 127A connects the SMT portion 121A and the spring portion 123A to each other. In detail, the connection portion 127A extends upward from the SMT portion 121A, then extends rearward, and further extends upward to be connected to the spring portion 123A. With this structure, the spring portion 123A and the SMT portion 121A are apart from each other in a predetermined direction. In the present embodiment, the predetermined direction is the up-down direction.

As understood from FIGS. 28 to 32, the auxiliary spring portions 123B are coupled to the spring portion 123A. Each of the auxiliary spring portions 123B extends forward to draw an arc from the spring portion 123A and then extends upward.

Figure 29:
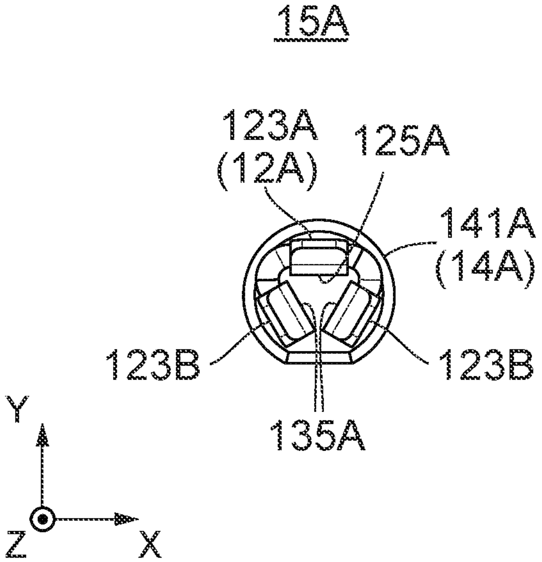
FIG. 29 is a plan view showing the terminal molded body of FIG. 28.
Figure 30:
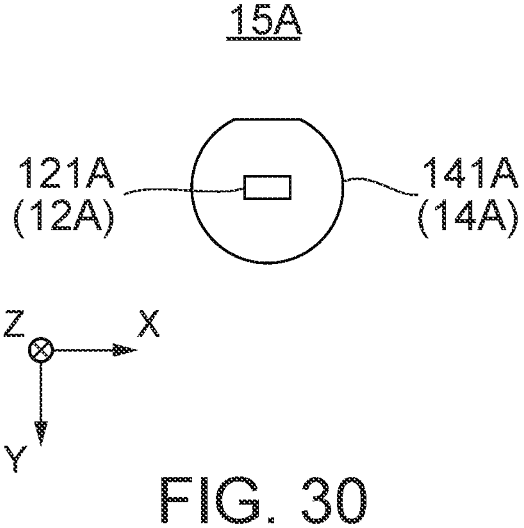
FIG. 30 is a bottom view showing the terminal molded body of FIG. 28.
Figure 31:
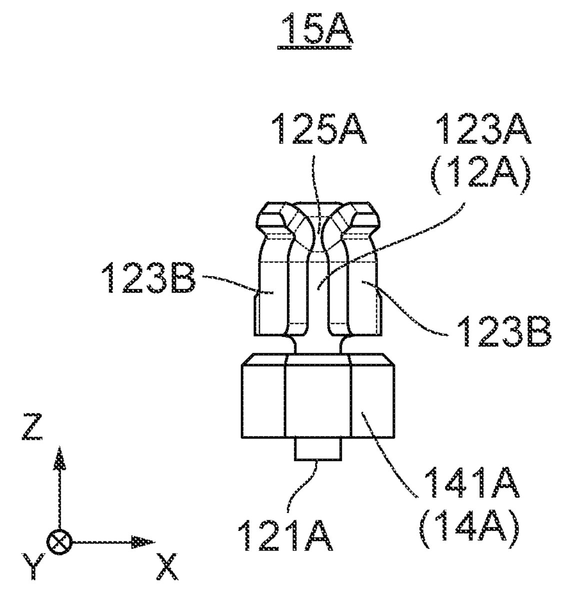
FIG. 31 is a front view showing the terminal molded body of FIG. 28.
Figure 32:
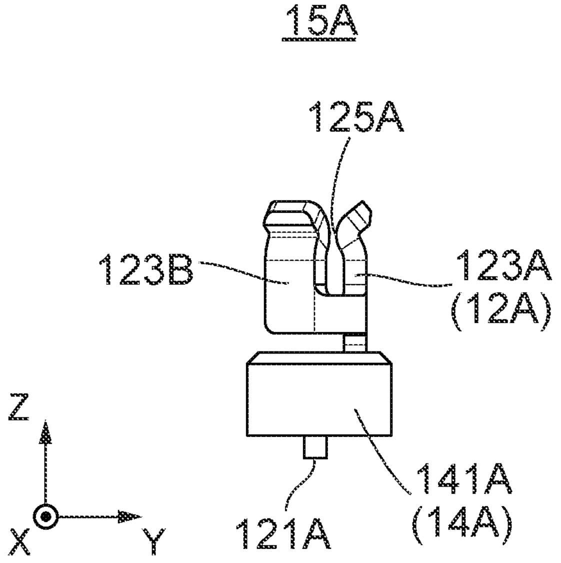
FIG. 32 is a side view showing the terminal molded body of FIG. 28.

As understood from FIGS. 28 and 29, the spring portion 123A supports the contact point 125A, and the auxiliary spring portions 123B support the auxiliary contact points 135A, respectively. In detail, the contact point 125A is a part of a surface of the spring portion 123A, and each of the auxiliary contact points 135A is a part of a surface of the auxiliary spring portion 123B corresponding thereto. The contact point 125A and the auxiliary contact points 135A are arranged to form an equilateral triangle when viewed along the up-down direction. Each of the spring portion 123A and the auxiliary spring portions 123B has resilience, and thereby each of the contact point 125A and the auxiliary contact points 135A is movable to get close to or go away from a center of the equilateral triangle.

As understood from FIGS. 25 and 27, the holding portion 14A has holding pieces 141A corresponding to the terminals 12A, respectively. Each of the holding pieces 141A is integrally insert-molded with the terminal 12A corresponding thereto. The holding piece 141A has a D-cut round shape when viewed along the up-down direction.

As shown in FIG. 27, each of the terminals 12A has the held portion 131A held by the holding piece 141A. The held portion 131A extends at least in the predetermined direction or the up-down direction. As understood from FIGS. 27, 28, 31 and 32, in the present embodiment, the held portion 131A is embedded in the holding piece 141A. The holding piece 141A or the holding portion 14A holds the held portion 131A all around in a plane perpendicular to the predetermined direction. Accordingly, solder wicking up from the SMT portion 121A to the connection portion 127A can be prevented when the connector 10A is mounted on the object (not shown).

Figure 23:
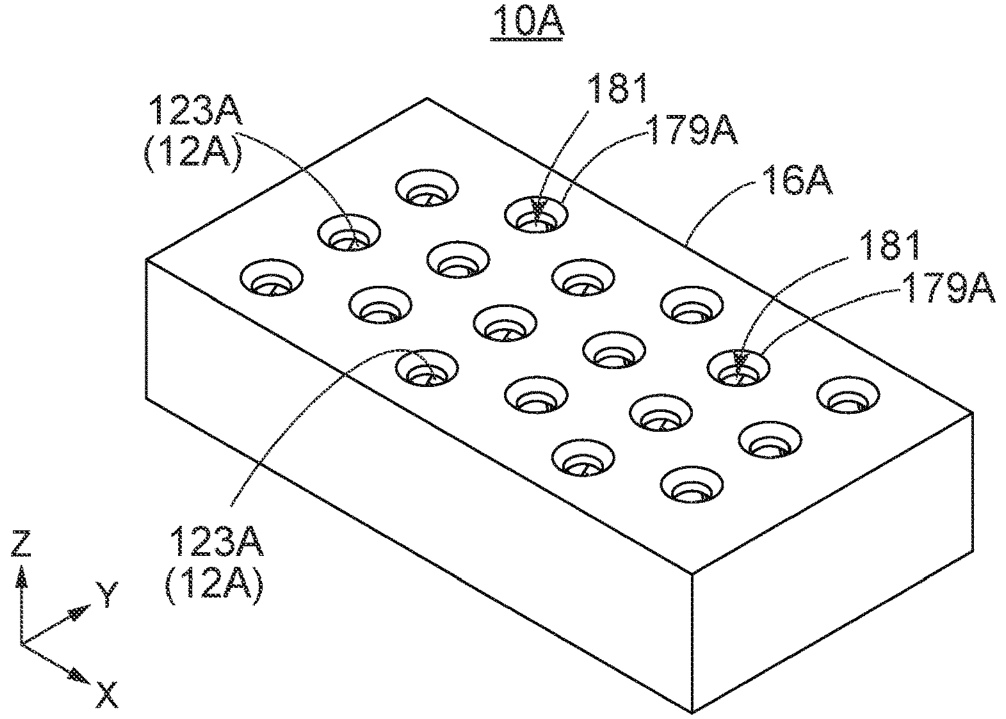
FIG. 23 is a perspective view showing a connector according to a second embodiment of the present invention.
Figure 33:
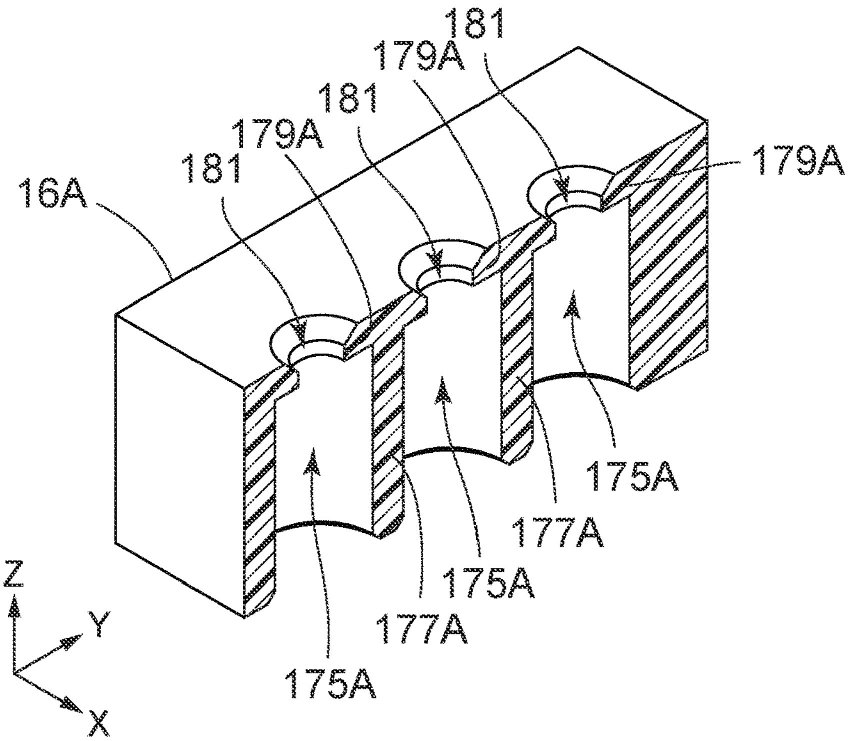
FIG. 33 is a cross-sectional, perspective view showing a part of a housing included in the connector of FIG. 23.

As shown in FIGS. 23 to 25, the housing 16A has an outer shape of a rectangular parallelepiped with a low profile. As shown in FIGS. 27 and 33, the housing 16A has the accommodation portions 175A corresponding to the terminals 12A, respectively. Between the accommodation portions 175A adjacent to each other, a barrier wall 177A is provided. Each of the accommodation portions 175A opens downward in the up-down direction. In the plane perpendicular to the up-down direction, the accommodation portion 175A is same as or similar to the holding piece 141A in shape. Moreover, in the plane perpendicular to the up-down direction, the accommodation portion 175A is equal to or slightly smaller than the holding piece 141A in size.

As shown in FIGS. 23 to 25, the housing 16A is further provided with protection portions 179A corresponding to the accommodation portions 175A, respectively. Each of the protection portions 179A defines a mating hole 181 which communicates with the accommodation portion 175A corresponding thereto. When viewed from above in the up-down direction, the mating hole 181 is a round shape. When viewed from above in the up-down direction, the contact point 125A and the auxiliary contact points 135A are visible through the mating hole 181. On the other hand, when viewed from above in the up-down direction, each of the spring portion 123A and the auxiliary spring portions 123B is hidden by the protection portion 179A at least in part. In particular, a tip of each of the spring portion 123A and the auxiliary spring portions 123B is hidden by the protection portion 179A. Accordingly, when the connector 10A and the mating connector (not shown) are mated with each other, each of the spring portion 123A and the auxiliary spring portions 123B can be prevented from buckling.

As understood from FIG. 27, terminal molded bodies 15A are press-fitted into the accommodation portions 175A, respectively, from beneath in the up-down direction. Thus, the terminals 12A together with the holding pieces 141A are accommodated in the accommodation portions 175A, respectively. Moreover, the housing 16A holds the holding pieces 141A of the terminal molded bodies 15A. Here, each of the housing 16A and the holding pieces 141A may be made of insulating resin. The insulating resin used for the housing 16A and the insulating resin used for the holding pieces 141A may be made of materials same as each other or different from each other. When the insulating resin used for the holding pieces 141A is lower than the insulating resin used for the housing 16A in hardness, press-fitting of the holding pieces 141A into the housing 16A can be easily carried out, and the housing 16A is prevented from being damaged.

Also in the present embodiment, the housing 16A is not integrally formed with the terminals 12A. Accordingly, a gap between the spring portion 123A and the barrier wall 177A can be as small as possible. In other words, the barrier wall 177A can be as large as possible in size, so that strength of the housing 16A can be improved. Moreover, a housing material density between two of the terminals 12A which are adjacent to each other can be increased, and a terminal pitch can be reduced while securing a necessary strength of the housing 16A.

Third Embodiment

Figure 34:
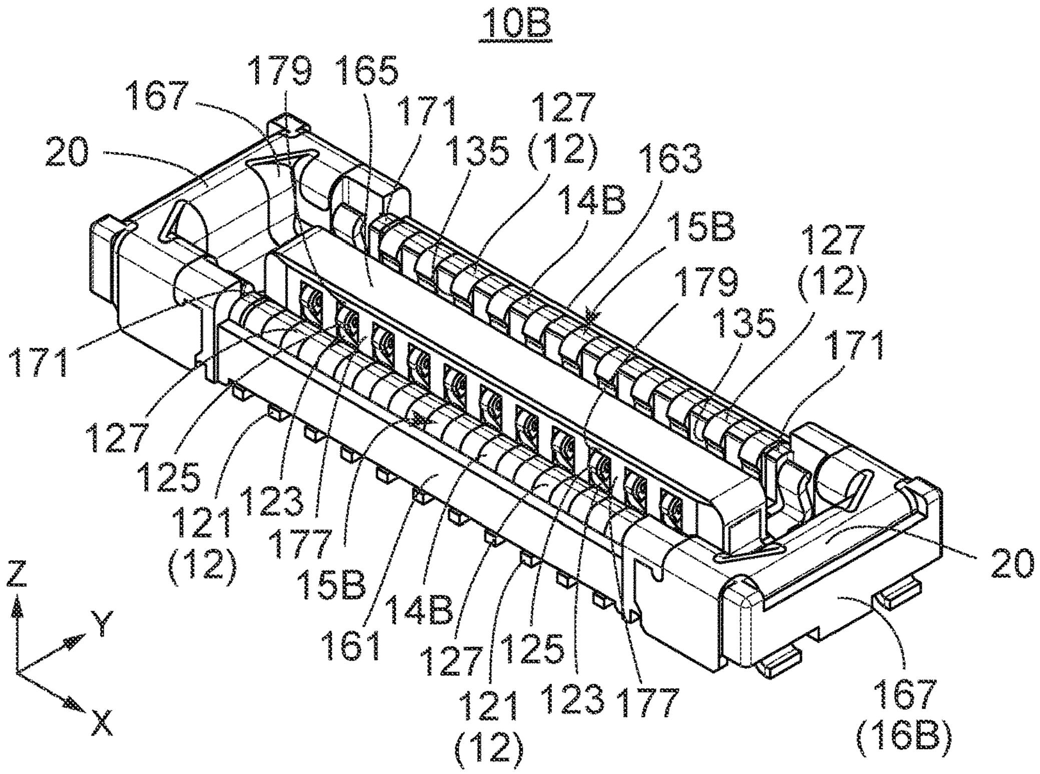
FIG. 34 is a perspective view showing a connector according to a third embodiment of the present invention.
Figure 35:
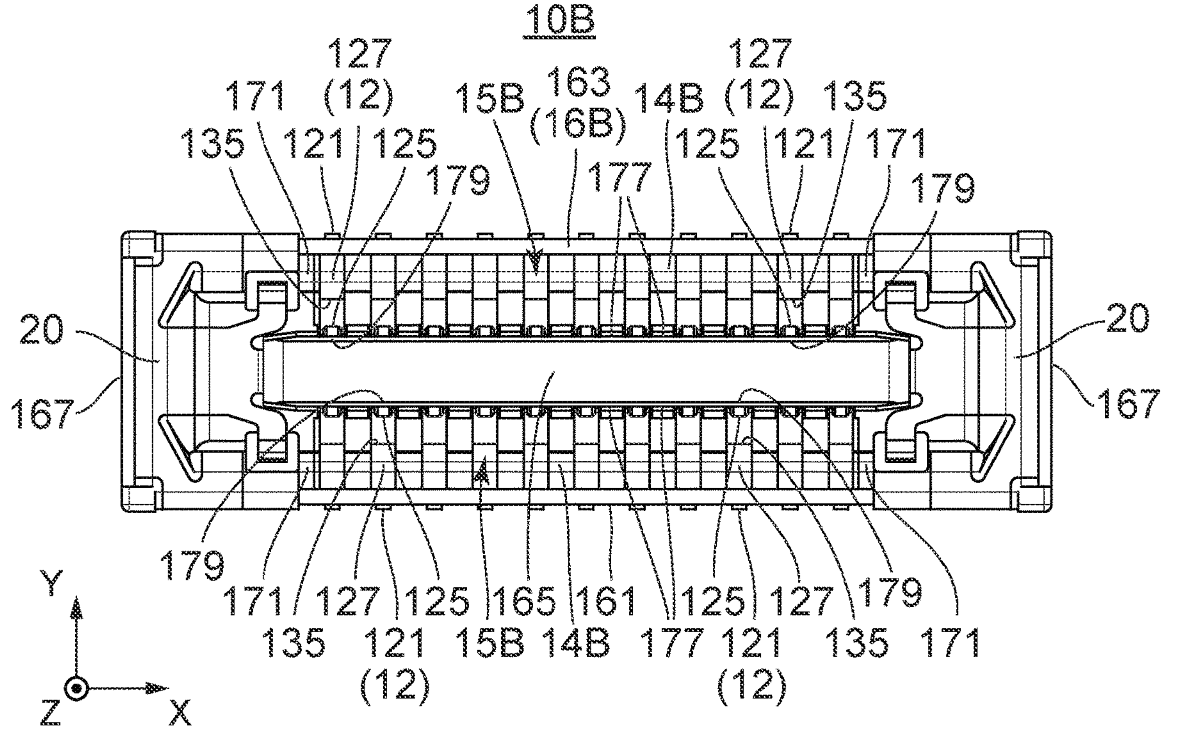
FIG. 35 is a plan view showing the connector of FIG. 34.
Figure 36:
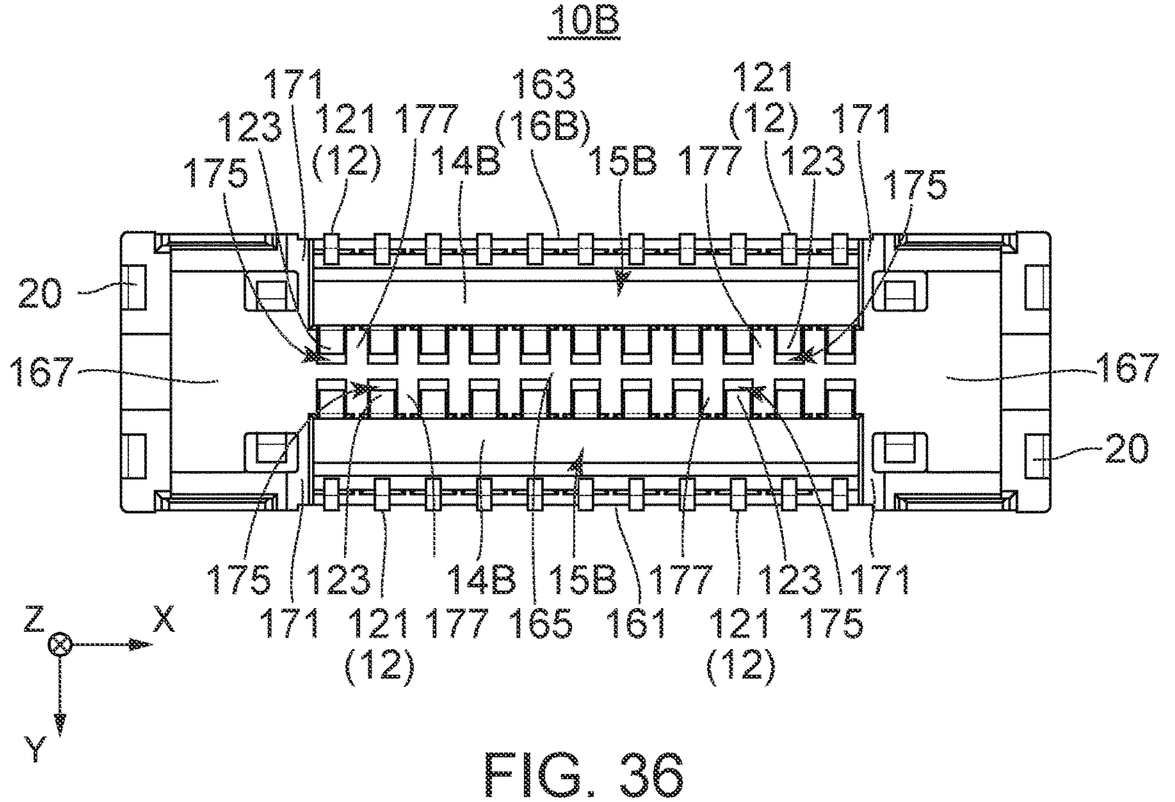
FIG. 36 is a bottom view showing the connector of FIG. 34.

Referring to FIGS. 34 to 36, a connector 10B according to a third embodiment of the present invention appears to be same as the connector 10 according to the first embodiment. However, the connector 10B is different from the connector 10 in the following points. In the following description, components of the connector 10B which are same as or similar to those of the connector 10 are denoted by the same or similar reference signs, and their descriptions are omitted.

Figure 37:
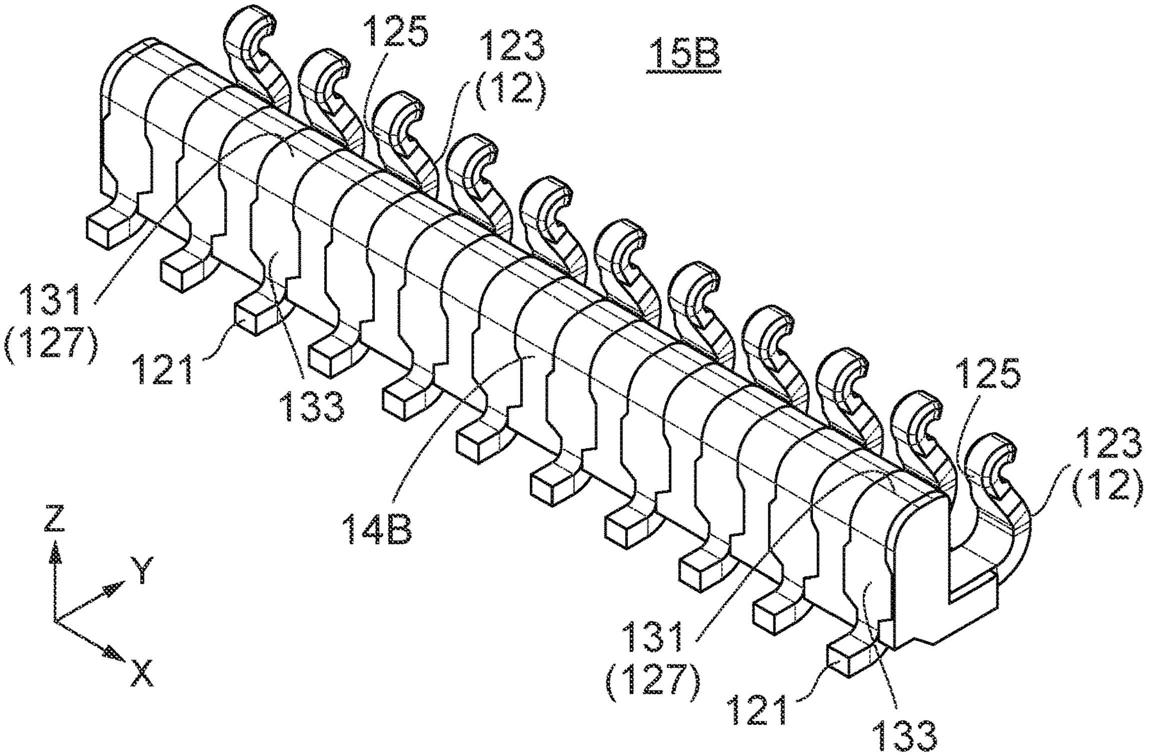
FIG. 37 is a perspective view showing a terminal molded body concerning a front raw included in the connector of FIG. 34.

As shown in FIG. 37, a plurality of signal terminals 12 arranged in a front row is held by a single holding portion 14B. The holding portion 14B is integrally insert-molded with the signal terminals 12 to form a terminal molded body 15B. The same is true of a plurality of signal terminals 12 arranged in a rear row. Thus, the plurality of the signal terminals 12 is held by the single holding portion 14B, so that the signal terminals 12 can be easily handled in the present embodiment. In the meanwhile, the signal terminals 12 cannot be separately handled in the present embodiment. Accordingly, differently from the first embodiment, the terminal molded body 15B cannot be used for another connector different from the connector 10B in point of the number of the signal terminals 12 or the arrangement of the signal terminals 12.

Figure 38:
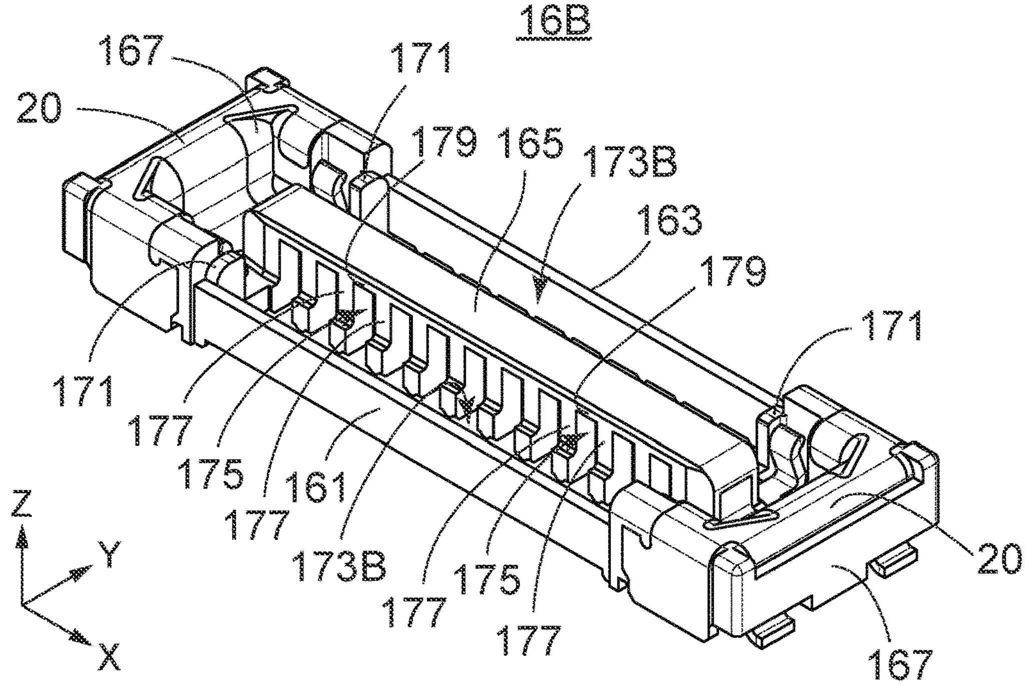
FIG. 38 is a perspective view showing a housing included in the connector of FIG. 34. The housing is integrally formed with power source terminals.
Figure 39:
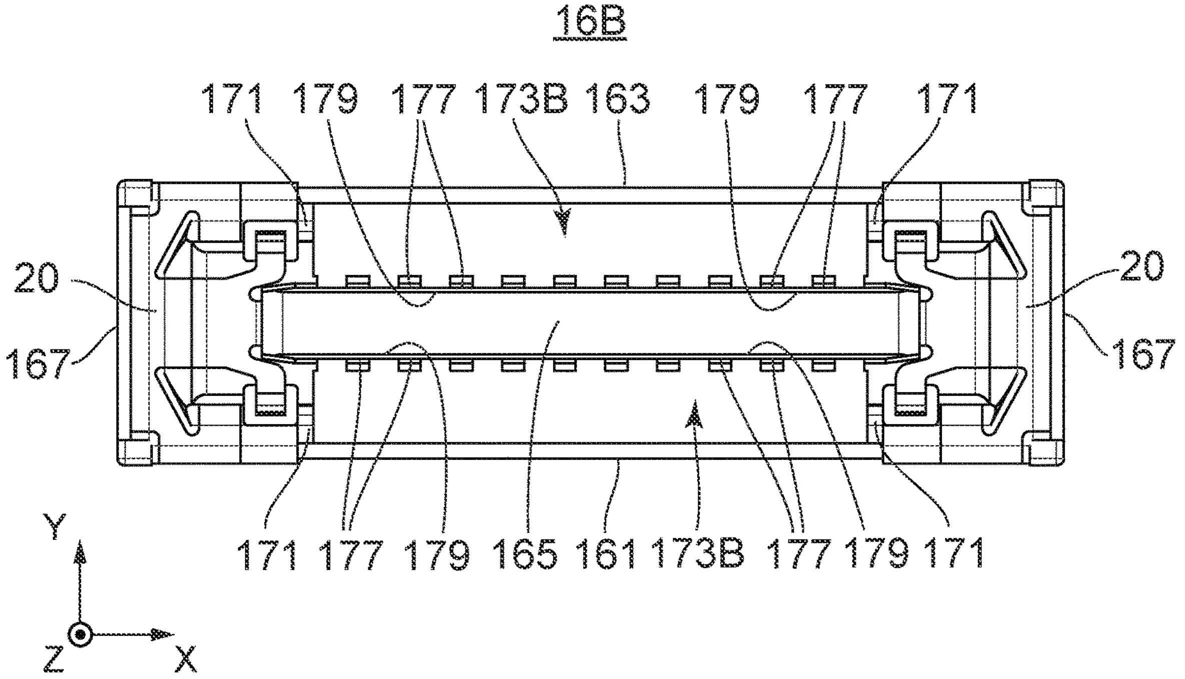
FIG. 39 is a plan view showing the housing of FIG. 38.
Figure 40:
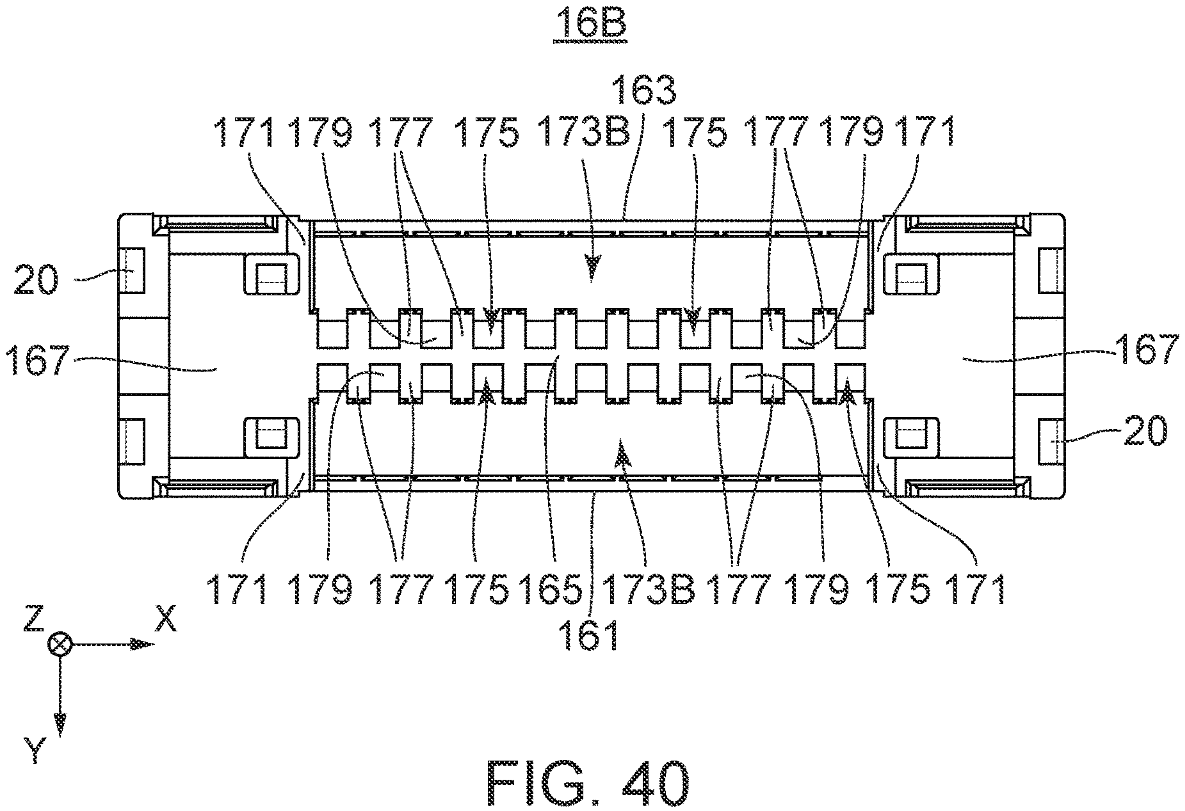
FIG. 40 is a bottom view showing the housing of FIG. 38.

As understood from FIGS. 38 to 40, a housing 16B has receiving portions 173B corresponding to the terminal molded bodies 15B, respectively. As apparent from comparing FIG. 18 with FIG. 39, the housing 16B does not have the partition wall 171 which is provided between two of the receiving portions 173 of the housing 16 which are adjacent to each other. However, the housing 16B has two partition walls 171 which define both side portions of each of the receiving portions 173B.

As understood from FIGS. 34 to 36, each of the terminal molded bodies 15B is press-fit into the housing 16B from beneath in the up-down direction. Each of the holding portions 14B is held between two of the partition walls 171. As a result, each of the signal terminals 12 of each of the terminal molded bodies 15B are received, in part, by the receiving portion 173 corresponding to the terminal molded body 15B, and the spring portion 123 of the spring terminal is accommodated in the accommodation portion 175 corresponding thereto at least in part. In the present embodiment, the same effects as in the first embodiment are obtained.

Although the specific explanation about the present invention is made above with reference to the embodiments, the present invention is not limited thereto but susceptible of various modifications and alternative forms without departing from the spirit of the invention.

Figure 41:
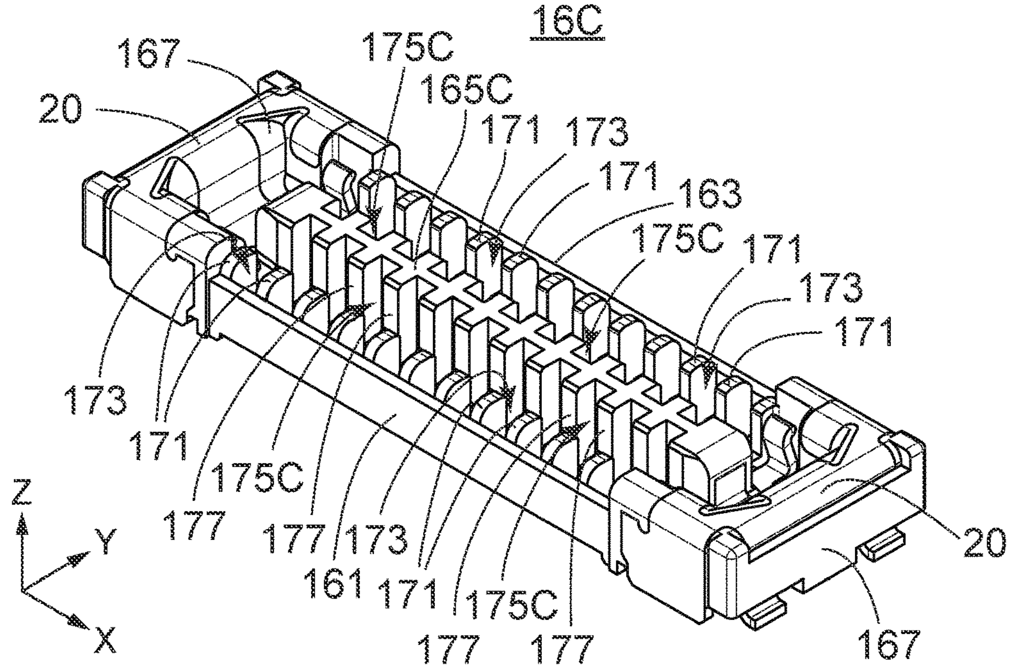
FIG. 41 is a perspective view showing a modified example of the housing of FIG. 17.
Figure 42:
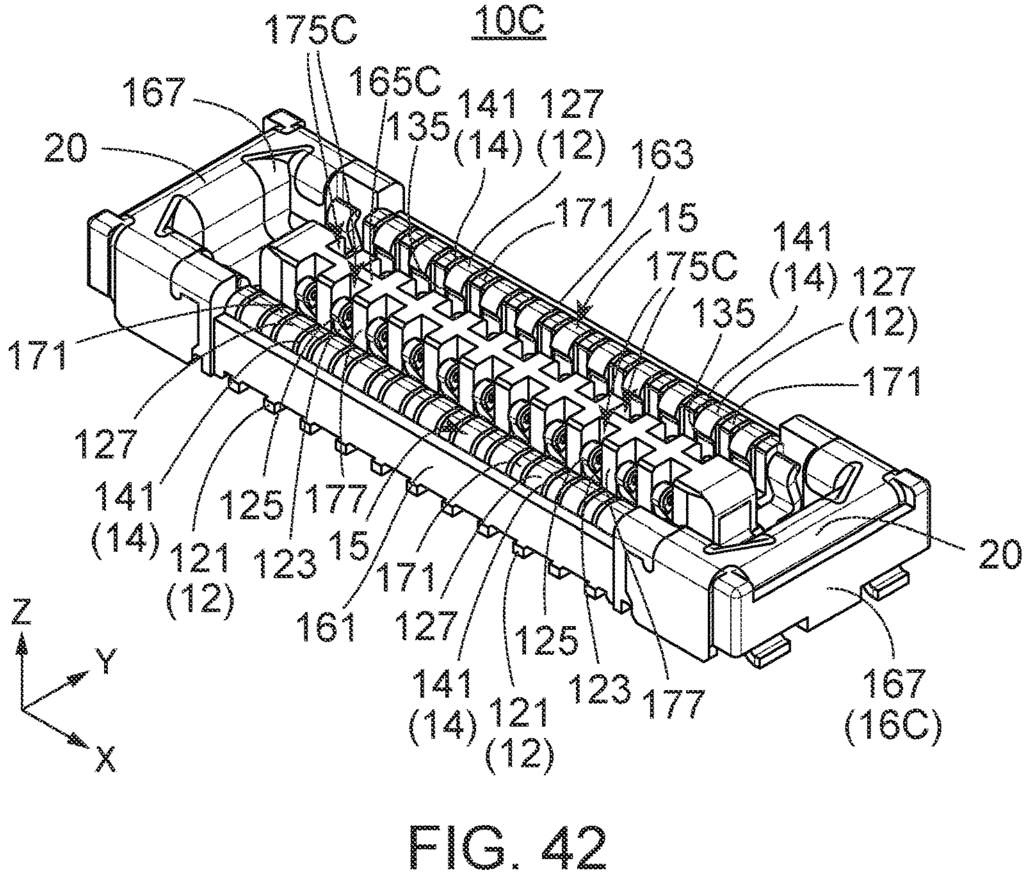
FIG. 42 is a perspective view showing a connector using the housing of FIG. 41.
Figure 43:
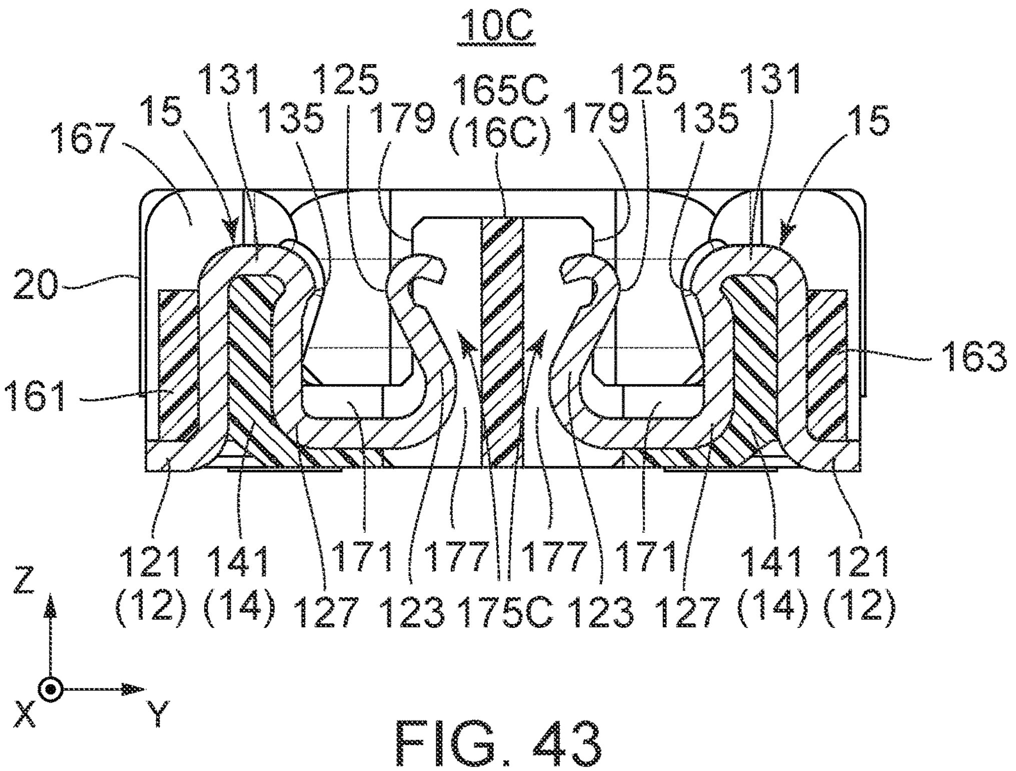
FIG. 43 is a cross-sectional view showing the connector of FIG. 42, taken at a position corresponding to a position of line A-A in FIG. 4.

For example, a housing 16C shown in FIG. 41 may be used in place of the housing 16 of the first embodiment. In that case, a connector 10C shown in FIGS. 42 and 43 can be formed. As apparent from comparing FIG. 41 with FIG. 17, comparing FIG. 42 with FIG. 1 or comparing FIG. 43 with FIG. 5, a middle wall 165C of the housing 16C is not provided with the protection portions 179 with which the middle wall 165 of the housing 16 is provided. In other words, accommodation portions 175C of the housing 16C open upward in the up-down direction. The housing 16C is simpler than the housing 16 in structure, so that molding thereof is easy.

Figure 44:
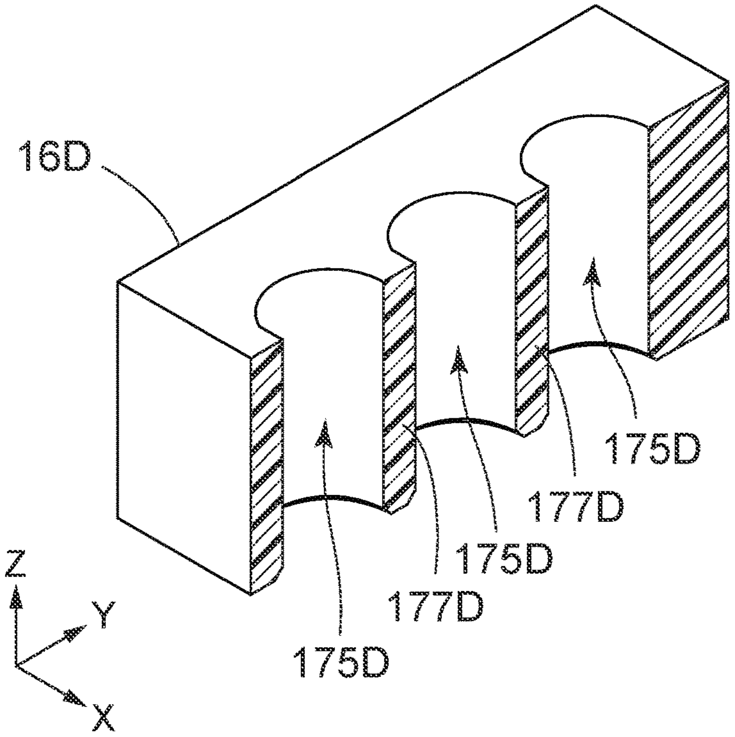
FIG. 44 is a cross-sectional view showing a modified example of the housing of FIG. 33.
Figure 45:
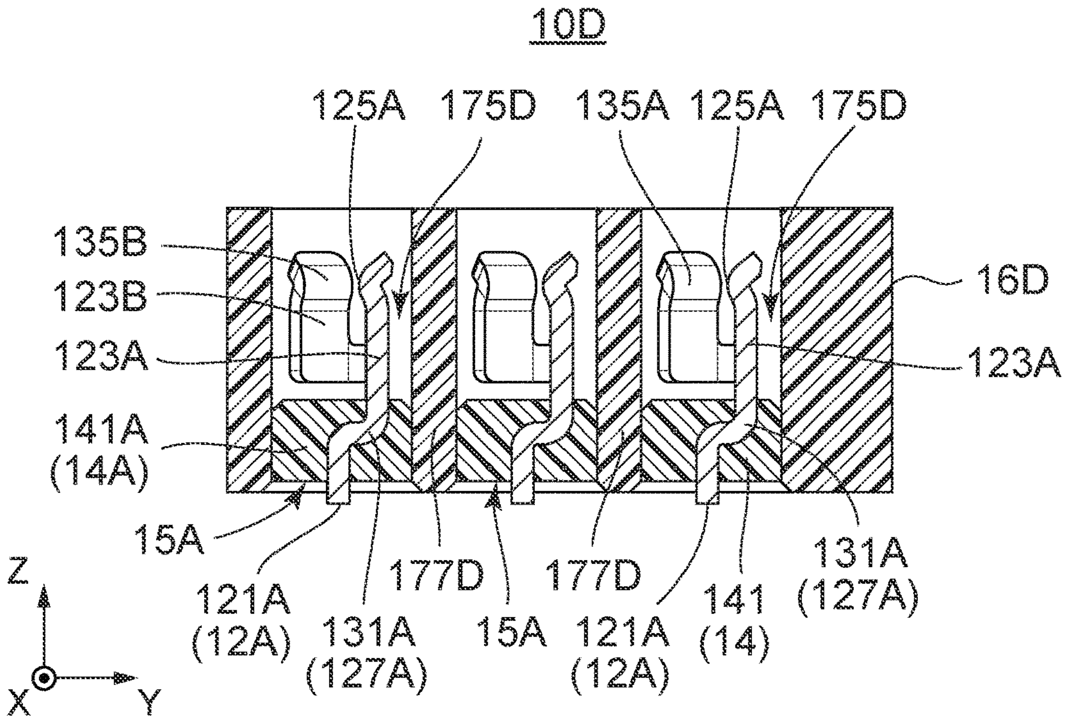
FIG. 45 is a cross-sectional view showing a connector using the housing of FIG. 44, taken at a position corresponding to a position of line C-C in FIG. 26.

A housing 16D having a cross-sectional structure shown in FIG. 44 may be used in place of the housing 16A of the second embodiment. In that case, a connector 10D having a cross-sectional structure shown in FIG. 45 can be formed. As apparent from comparing FIG. 44 with FIG. 33 or comparing FIG. 45 with FIG. 27, the housing 16D is not provided with the protection portions 179A with which the housing 16A is provided. In other words, an inner wall defining each of accommodation portions 175D of the housing 16D extends straightly upward in the up-down direction Accordingly, a cross-sectional shape of a barrier wall 177D is different from that of the barrier wall 177A. The housing 16D is simpler than the housing 16A in structure, so that the housing 16D can be easily molded.

Figure 46:
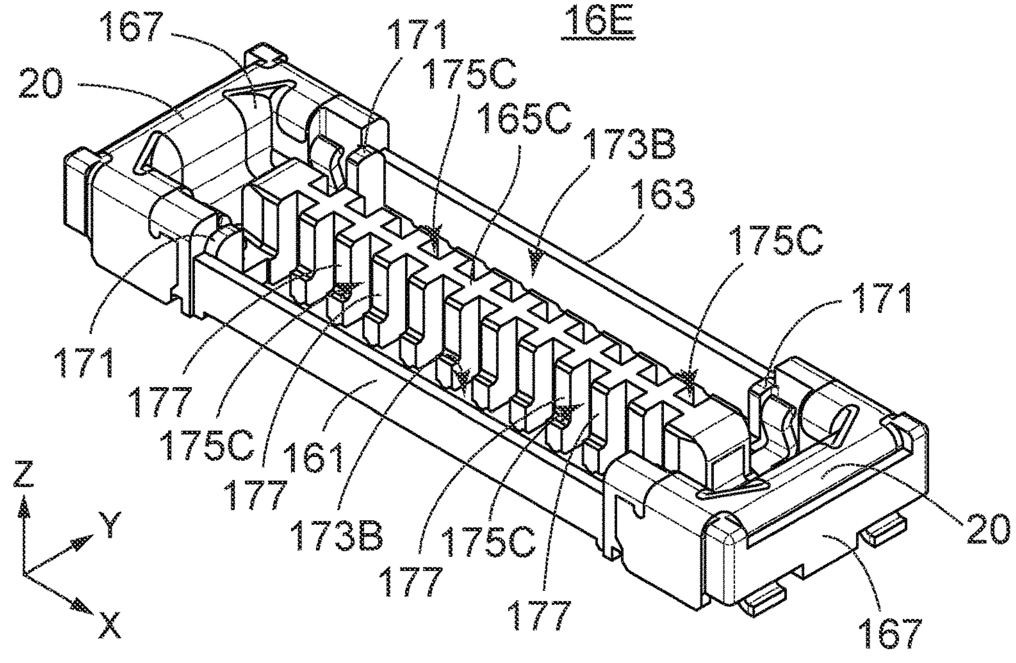
FIG. 46 is a perspective view showing a modified example of the housing of FIG. 38.
Figure 47:
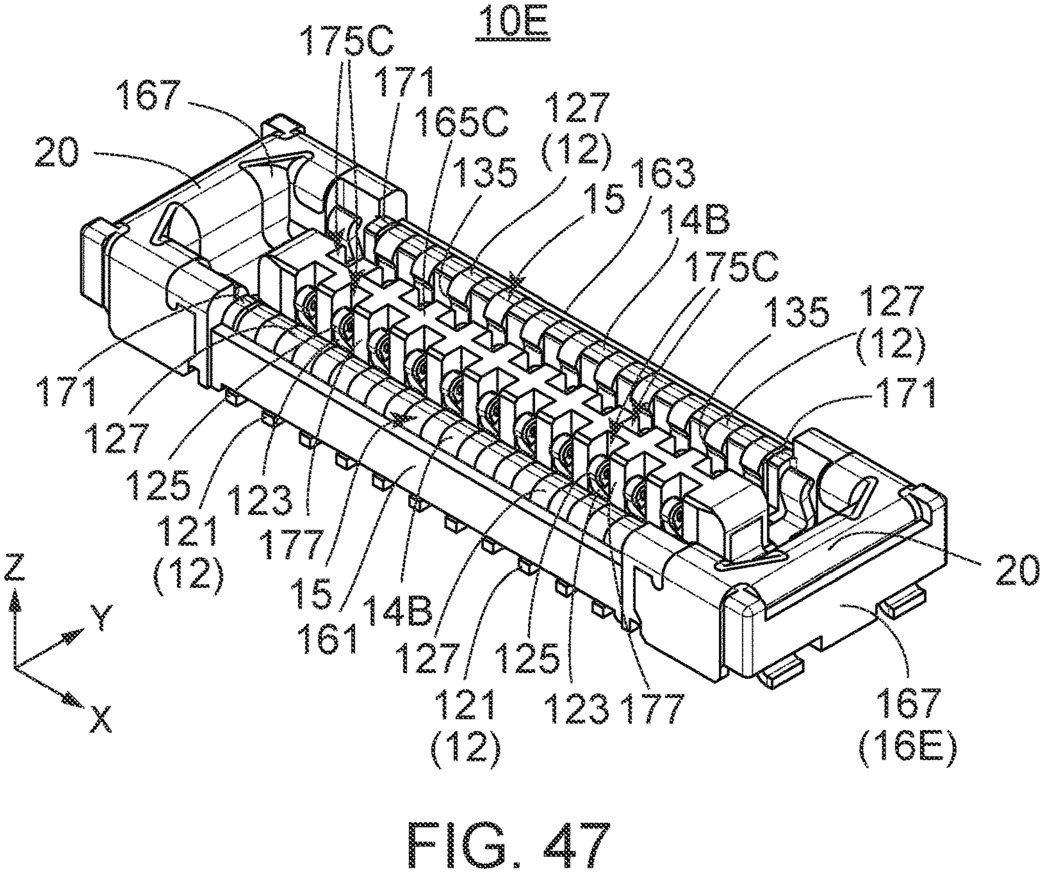
FIG. 47 is a perspective view showing a connector using the housing of FIG. 46.
Figure 48:
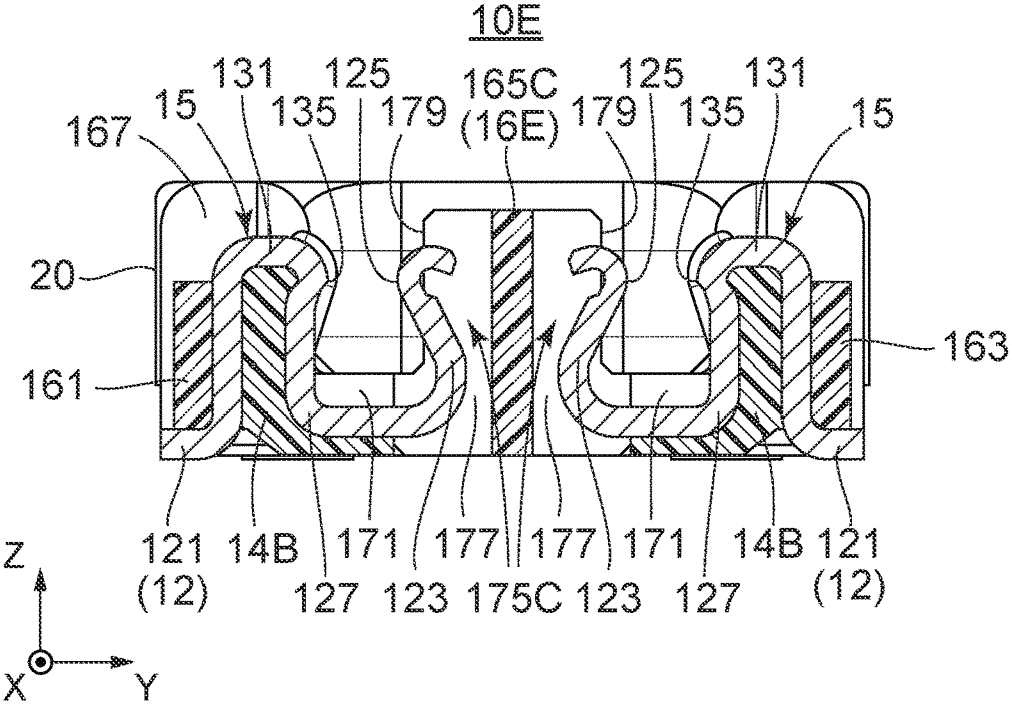
FIG. 48 is a cross-sectional view showing the connector of FIG. 47, taken at a position corresponding to a position of line A-A in FIG. 4.
Figure 49:
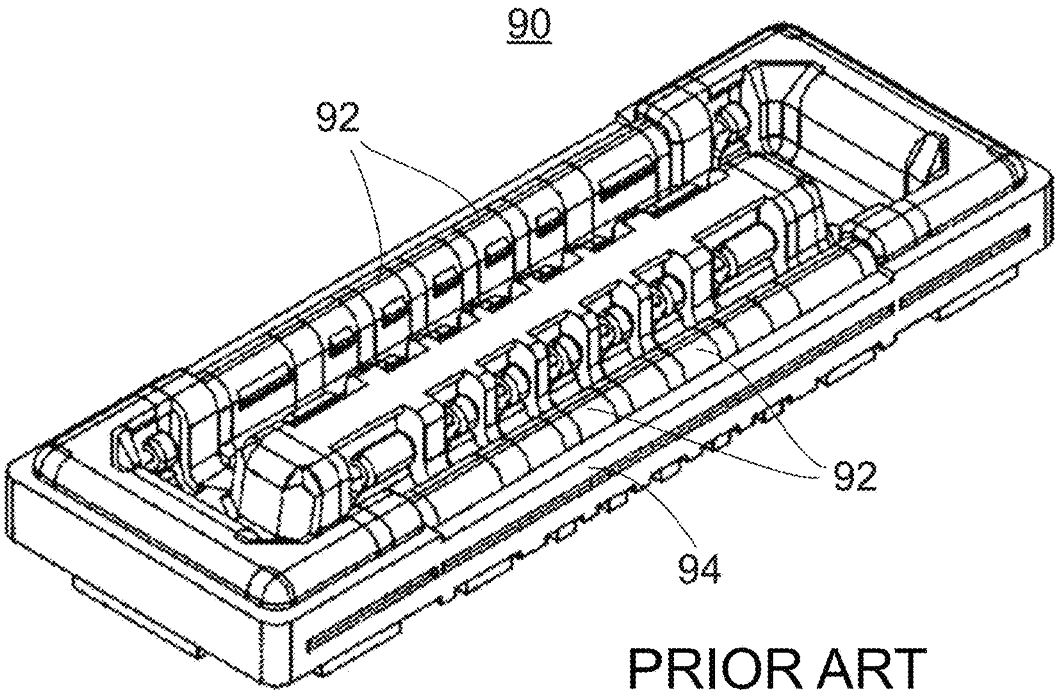
FIG. 49 is a perspective view showing a connector disclosed in Patent Document 1.
Figure 50:
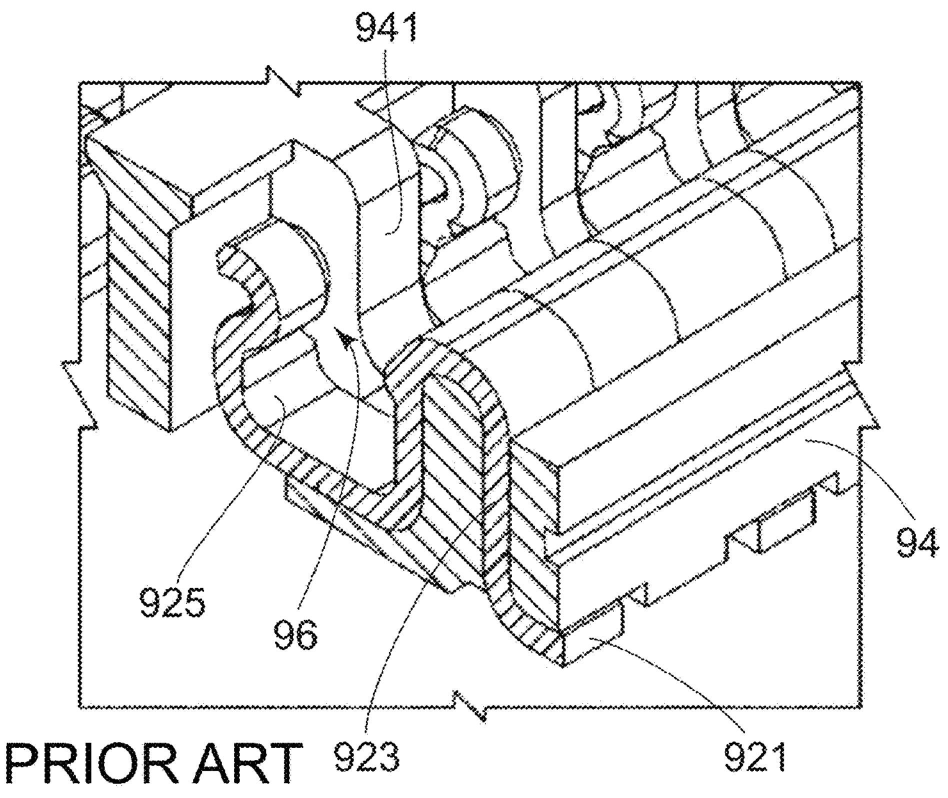
FIG. 50 is a cross-sectional view showing a part of the connector of FIG. 49 on an enlarged scale.

Furthermore, a housing 16E shown in FIG. 46 may be used in place of the housing 16B. In that case, a connector 10E shown in FIGS. 47 and 48 can be formed. As apparent from comparing FIG. 46 with FIG. 38 or comparing FIG. 47 with FIG. 34, the housing 16E is not provided with the protection portions 179 with which the housing 16B is provided.

Each of the aforementioned embodiments employs press-fitting as a fixing method for making the housing 16 (16A, 16B, 16C, 16D or 16E) hold the holding portions 14 (14A, or 14B). However, the present invention is not limited thereto. For example, other methods, such as gluing, welding, two-color molding, etc. may be used as the fixing method.

In each of the aforementioned embodiments, the housing 16 (16A, 16B, 16C, 16D or 16E) is made of insulating resin. However, the present invention is not limited thereto. For example, a housing may be made by using other materials, such as metal, ceramics, non-insulating resin materials, conductive resin, etc.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector comprising:

a plurality of terminals;

a holding portion made of an insulating resin; and a housing, wherein:

each of the terminals has a surface mounting technology (SMT) portion, a spring portion, a contact point, and a connection portion;

the SMT portion is to be soldered when the connector is mounted on an object;

the spring portion has resilience;

the contact point is supported by the spring portion;

the spring portion and the SMT portion are apart from each other in a predetermined direction;

the connection portion connects the spring portion and the SMT portion to each other;

the connection portion has a held portion extending at least in the predetermined direction;

the held portion is embedded in the holding portion at least in part so that the holding portion holds the held portion;

the holding portion is directly held by the housing;

the housing has a plurality of accommodation portions which accommodate the spring portions of the terminals, respectively, and a barrier wall which separates two of the accommodation portions which are adjacent to each other, and the holding portion comprises a plurality of holding pieces which correspond to the terminals, respectively, and are separated from each other.

2. The connector as recited in claim 1, wherein:

the connector defines a mating direction directed upward in an up-down direction; and the holding portion is press-fit into the housing from beneath in the up-down direction.

3. The connector as recited in claim 2, wherein:

the housing has a protection portion; and the protection portion hides the spring portion in part when viewed from above in the up-down direction.

4. The connector as recited in claim 1, wherein:

the connector defines a mating direction directed upward in an up-down direction; and the holding portion hides the held portion when viewed from beneath in the up-down direction.

5. The connector as recited in claim 1, wherein:

the connector defines a mating direction directed upward in an up-down direction;

the predetermined direction is the up-down direction; and the holding portion holds an entire periphery of the held portion in a plane perpendicular to the predetermined direction.

6. The connector as recited in claim 1, wherein the housing and the holding portion are both made of a same insulating resin material.

7. The connector as recited in claim 1, wherein the housing is made of an insulating resin material which is different from a material of which the holding portion is made.

* * * * *